United States Patent

[11] 3,580,499

[72] Inventors Peter Bauer
Germantown;
William R. Mentzer, Jr., Silver Spring, both of, Md.
[21] Appl. No. 771,758
[22] Filed Oct. 30, 1968
[45] Patented May 25, 1971
[73] Assignee Bowles Fluidics Corporation
Silver Spring, Md.

[54] FLUIDIC SLIP-RESOLVER SYSTEM
19 Claims, 6 Drawing Figs.
[52] U.S. Cl. .................................................. 235/201,
73/505, 137/487.5
[51] Int. Cl. ................................................... G06d 5/00
[50] Field of Search........................................... 235/200,
201; 137/81.5, 487.5

[56] References Cited
UNITED STATES PATENTS
3,237,858  3/1966  Schoppe et al. ............... 235/201
3,241,758  3/1966  Gobhai........................ 235/201

Primary Examiner—Richard B. Wilkinson
Assistant Examiner—Lawrence R. Franklin
Attorney—Hurvitz, Rose and Greene ABSTRACT: A fluidic system for monitoring relative frequency variations between two fluid pulse trains includes a fluidic clock pulse generator, a fluidic time synchronization circuit, a fluidic slip-resolver circuit and a fluidic up-down binary counter. The two fluid pulse trains are time synchronized and fed to a slip-resolver circuit, the output stage thereof providing output pulses when two or more successive pulses occur in one input pulse train between successive input pulses in the other train. Output pulses from the slip-resolver are counted by an up-down counter. Logic circuitry is provided to determine up or down counting modes in accordance with which input pulse train is increasing in frequency. In addition, fluidic switching circuits in the system receive sharply defined switching pulses by utilizing a shaper.

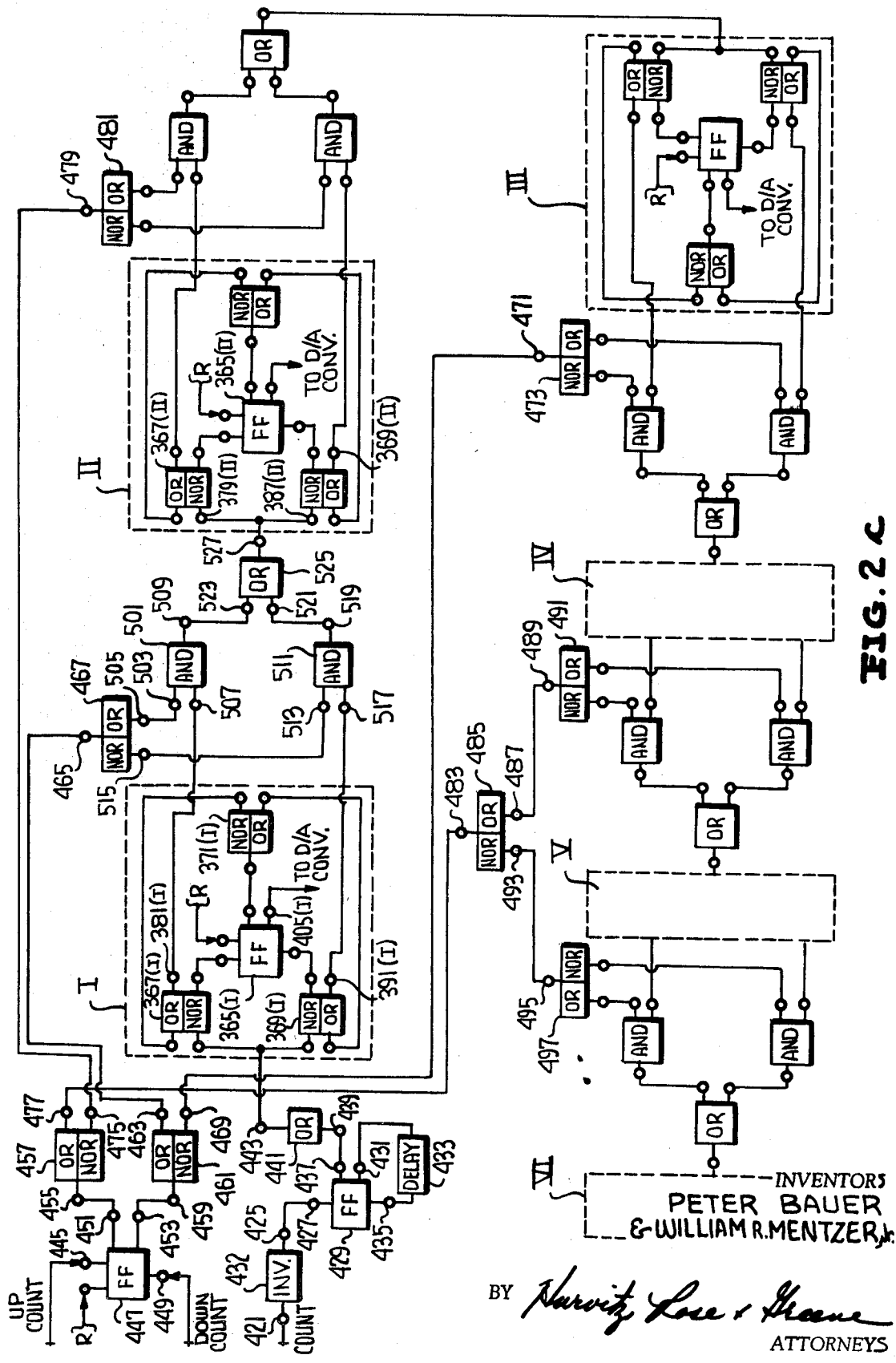

FLUIDIC SLIP-RESOLVER SYSTEM

BACKGROUND OF THE INVENTION

The present invention relates to fluidic binary logic systems and, more particularly, to fluidic binary logic circuitry required to provide a fluidic slip-resolver system which is able to discern relative frequency changes between two fluid pulse trains.

In various types of fluidic systems, certain difficulties are encountered when one attempts to integrate the system parameter derived in terms of two differentially varying low-level pressure signals. Examples of these difficulties are found in attempts to integrate the rate of turn signal derived from a vortex rate sensor, particularly where the integrating interval is relatively long. The conventional method for integrating an analog signal in a pure fluid system is to apply the signal to a storage capacitor or tank so that the pressure in the tank becomes a function of the total quantity of fluid supplied thereto. Such a device, however, has two inherent difficulties. The first difficulty relates to the fact that, if a signal is applied thereto for a relatively long period of time, the pressure in the tank approaches the pressure of the input signal and no further fluid can be supplied to the tank. Thus, although the signal may continue for an additional extended period, the tank is "charged" to the pressure of the signal and all subsequent information is lost. It is evident that this problem can be overcome by supplying a tank which is sufficiently large in relation to the anticipated duration of input signal so that the tank will not be charged by the input signal. The second difficulty encountered in the use of such a tank as an integrating device is the loss of position information previously accumulated. If, for example, the system is entirely fluidic, as has been assumed here, then the device for sensing the pressure in the tank must necessarily draw some appreciable amount of fluid from the tank. To the extent that the sensing apparatus accepts fluid from the tank, the tank is discharged and a loss of memory results. The time interval over which such a tank may retain position information is a function of the size of the tank relative to the rate of removal of fluid from the tank by the sensing apparatus. Again, a sufficiently large tank will overcome this problem; however, where position information must be accumulated and retained for even so short an interval as several minutes, the size of the tank becomes impractical for most system applications.

In copending U.S. Pat. No. 3,459,054 filed Oct. 22, 1965 by Edwin M. Dexter and entitled "Vortex Readout system," one approach to solving the above-stated problems is set forth. Specifically, the two analog differentially varying fluid pressures representing the rate of rotation of fluid in the egress passage of a vortex rate sensor are applied to respective pressure-controlled oscillators which in turn produce respective pulse trains having frequencies which vary substantially linearly with the pressure levels of their input signals. The pulses in the trains are counted by respective fluidic counters and the instantaneous difference in the counts stored in the two counters is sensed as an integrated function of the rotational rate of fluid in the vortex device egress orifice.

The system of the present invention is also suitable for providing an integrated function of the rotational rate of fluid in the egress orifice of a vortex rate sensor, but employs an approach which is somewhat different from that employed in the above-referenced U.S. patent application by Edwin M. Dexter. The present system, as will be understood from the description hereinbelow, eliminates the necessity of comparing continuously changing counts in two different counters; such comparisons require rather complex logic arrangements to assure accuracy. In developing the system of the present invention it was necessary to develop unconventional fluidic subsystems and circuits in order to expeditiously effectuate various system concepts. Thus, for example, it was necessary, for proper operation of the system of the present invention, to develop a novel fluidic slip-resolver circuit which is capable of comparing two frequency-modulated signals with respect to their instantaneous frequency difference and providing an output pulse rate representing that difference along with a polarity signal representing the sign or sense of that difference. In order to accomplish this, however, it was also necessary to time-synchronize the two frequency-modulated signals by means of a novel fluidic time-synchronization circuit which serves to allocate specific time intervals for the pulses in the two input frequency-modulated signals so that the slip-resolver circuit would be spared from having to process two simultaneously received pulses. Further, to achieve proper operation of the novel time-synchronization circuit it was found necessary to develop an improved fluidic clock pulse generator compatible with the requirements of both the time-synchronization circuit and the slip-resolver circuit. Moreover, in attempting to process the fluid count pulses provided by the slip-resolver circuit, it was found that prior art fluidic "up-down" binary counters were unreliable in that switching operations proceeded in rather erratic fashion from stage to stage. This led to the development of a novel fluidic up-down binary counter which operates reliably in response to the pulses produced by the slip-resolver circuit. In still another aspect of the development of the system of the present invention, it was found that switching operations in the various logic circuits employed in the system tended to be somewhat unreliable due to the poorly shaped pulses produced by conventional fluidic elements. It was therefore necessary to develop a novel fluidic pulse shaper to permit conversion of poorly shaped fluid pulses to short fluid pulses having sharply defined leading and trailing edges.

The slip-resolver circuit, time synchronizer circuit, clock pulse generator, up-down binary counter and pulse shaper developed for the purpose of producing an operable embodiment of the system of the present invention are all considered to be part of the present invention, independently of the overall system. In addition, as will be pointed out hereinbelow, the individual system components as well as the overall system have been found to have broader application than that for which they were originally developed and it is within this broader frame of reference that the various aspects of the present invention must be viewed.

It is therefore an object of the present invention to provide a fluidic system for accurately integrating a fluid signal in the form of two differentially varying pressure signals.

It is another object of the present invention to provide a fluidic system for monitoring the relative frequency difference between two variable frequency pulse trains.

It is another object of the present invention to provide a fluidic slip-resolver circuit for providing an output pulse rate proportional to the difference in frequency of two input pulse trains.

It is another object of the present invention to provide a novel fluidic up-down binary counter.

It is another object of the present invention to provide a novel fluidic pulse converter for utilization as one or more stages in an up-down binary counter.

It is another object of the present invention to provide a fluidic time-synchronization circuit for shifting randomly occurring input pulses in time to permit processing of such pulses without overlap.

It is another object of the present invention to provide a novel fluidic clock pulse generator.

It is another object of the present invention to provide a fluidic clock pulse generator capable of producing two oppositely phased clock pulse trains each of which operates with less than a 50 percent duty cycle.

It is another object of the present invention to provide a novel fluidic pulse shaper.

SUMMARY OF THE PRESENT INVENTION

The system provided in accordance with the principles of the present invention is capable of receiving pulse trains of independently variable frequency and providing an output signal which is a function of the integral of the difference between the frequencies of the pulse trains. The pulse trains, for example, may come from a pair of pressure controlled oscillators (PCO's) which in turn receive a pair of differentially varying pressure signals such as might be provided as the output parameter of a vortex rate sensor. Each input pulse train is received by a respective time-synchronization circuit which shifts the various input pulses in time as necessary for expeditious processing by the system logic circuitry. Synchronization is based on the repetition period of clock pulses provided by the clock pulse generator of the system, the latter providing a pair of oppositely phased clock pulse trains having duty cycles of less than 50 percent. The frequency of the clock pulses is chosen to be greater than the highest permissible input pulse frequency. One of the synchronization circuits provides a train of synchronized pulses wherein each pulse corresponds to a pulse in a first of the input pulse trains but shifted in time as necessary so that the synchronized pulse occurs during a clock pulse of a first of the clock pulse trains. Similarly, the other synchronization circuit provides a synchronized pulse train in which each synchronized pulse corresponds to a pulse in the other of the input pulse trains and which is shifted in time as necessary so that these synchronized pulses each occur during a clock pulse in the second clock pulse train. Since the two clock pulse trains are oppositely phased, there can be no time coincidence of pulses in the first and second synchronized pulse trains regardless of any such coincidence that might occur in the unsynchronized input pulse trains. Also, since the PRF of the clock pulse train is greater than the maximum input pulse PRF, no more than one input pulse can fall within a single clock PRF.

The two synchronized pulse trains are then fed to the set and reset ports respectively of an input fluidic flip-flop in the slip-resolver circuit. The input flip-flop thus assumes a first state (set) in response to each pulse in the first synchronized pulse train and a second state (reset) in response to each pulse in the second synchronized pulse train. The input pulses are also applied to respective fluidic OR/NOR logic gates which provide output signals in accordance with the state of the input flip-flop at the time each synchronized pulse is received. More specifically, the input flip-flop in effect remembers which of the synchronized pulse trains most recently provided an input pulse. If the next input pulse comes from the same pulse train that provided the last input pulse, one of the logic gates provides an output pulse. Similarly, the other logic gate will provide an output pulse when two successive input pulses are received from the other of the synchronized pulse trains. So long as the synchronized pulse trains provide input pulses to the input flip-flop in alternation, neither of the two OR/NOR gates provides an output pulse. The output signals from the logic gates are therefore indicative of a relative phase shift of $2\pi$ or 360° between the two synchronized pulse trains; that is, one more complete cycle has transpired in one of the synchronized pulse trains than in the other. The output pulses from the two OR/NOR gates are fed to respective set and reset input ports of a second stage fluidic set-reset flip-flop in the slip-resolver circuit. The second stage of the slip-resolver is identical to the first, and the second stage flip-flop assumes a first state (set) in response to an input pulse from the first of the first stage OR/NOR gates and assumes a second state (reset) in response to a pulse from the second of the first stage OR/NOR gates. The OR/NOR gates associated with the second stage of the slip-resolver receive respective pulses from the first stage OR/NOR gates as well as signals representing the state of the second stage flip-flop; the second stage OR/NOR gates thus provide output pulses only in response to two successive pulses being received by the second stage flip-flop from the same first stage OR/NOR gate. In other words, the second stage flip-flop and its associated logic gates operate in the same manner as the input stage flip-flop and its associated logic gates but processes output pulses from the first stage rather than processing pulses from the synchronized pulse trains. The purpose of the second stage flip-flop and its associated logic circuits is to inhibit all pulses from the first stage logic gates which correspond to an initial $2\pi$ or 360° phase shift between the synchronized pulse trains. This initial full cycle phase shift occurs merely because the clock pulse frequency is somewhat greater than the input pulse train frequency and therefore produces an initial relative displacement between pulses in the two synchronized pulse trains. This initial shift therefore does not truly represent a 360° phase shift between the unsynchronized input pulse trains. The second stage of the slip-resolver circuit thus provides an output pulse in response to the second and subsequent successive output pulses from the same first stage OR/NOR gate. The output pulses from the second stage of the slip-resolver circuit represents true 360° phase shifts between the unsynchronized input pulse trains.

The output pulses from the second stage of the slip-resolver circuit are applied to the first stage of a fluidic up-down binary counter with additional logic circuitry being provided to indicate to the counter whether the particular pulse is an up-count or down-count pulse (up-count indicating that the first input pulse train frequency is increasing relative to the second input pulse train frequency; down-count indicating that the second input pulse train frequency in increasing relating to that of the first). Each counter stage comprises a novel pulse converter having a set-reset type fluidic flip-flop with set and reset input ports to which the NOR output passages of two respective fluidic OR/NOR gates are connected. The input count pulses, in the form of pulsed interruptions of a positive pressure, are applied to an input port of each of the OR/NOR gates. A second input port of each of the OR/NOR gates receives a signal representing the state of the pulse converter flip-flop from a feedback circuit connected to one of the output passages of the flip-flop. The feedback circuit comprises a fluidic logic inverter which applies complementary logic signals to the second input ports of the OR/NOR gates in accordance with the state of the flip-flop. In the absence of a count pulse, the positive pressure on the input line connected to the first input ports of each of the OR/NOR gates maintains both gates in their OR mode so that no NOR signal is received by the flip-flop which therefore remains in its previously assumed state. The OR/NOR gates are primed by that state by means of the aforementioned feedback circuit so that the next pulsed interruption of the positive pressure on the input line produces a NOR signal at the one of the OR/NOR gates having no positive pressure applied to the other of its input ports from the feedback circuit. The resulting NOR signal from that particular OR/NOR gate serves to switch the flip-flop, changing the state of the inverter in the feedback path, and thereby applying a positive pressure to the second input port of that OR/NOR gate which had previously received no positive pressure, and removing the positive pressure from the second input port of that OR/NOR gate which had previously received a positive pressure. Consequently, the other OR/NOR gate is now primed for the next count pulse to shift the state of the flip-flop accordingly and thereby the flip-flop will change state alternately in response to successive input pulses applied to the input line.

The input count pulses to second and subsequent counter stages are derived from the OR output passages of the OR/NOR gates in the preceeding counter stage. The OR signals are normally positive pressures which are momentarily interrupted during alternate state changes of the flip-flop in the preceeding stage. These interruptions of the OR pressure signals are gated in their application to the next counter stage by logic signals representing the up or down counting modes of the counter. Thus, succeeding stages are switched or not in accordance with which OR/NOR gate of the preceeding stage is pulsed and which counting mode is presently in force.

In accordance with the principles of the present invention, a pulse shaper is provided for utilization in the various logic circuits to assure that constant width, sharp edged pulses are available to enable the various circuits to switch with the accuracy required by the system. The shaper comprises a set-reset fluidic flip-flop and a fluidic OR/NOR gate wherein the fluidic input pulses to be shaped are positive going pulses applied simultaneously to an input port of the OR/NOR gate and the set input port of the flip-flop. The reset output signal of the flip-flop is connected as another input signal to the OR/NOR gate and the NOR output passage of the OR/NOR gate is connected to the reset input port of the flip-flop. The flip-flop is set by each input pulse, removing the reset binary one signal from the OR/NOR gate input port. Until the input pulse terminates, however, a binary one signal remains at the other input port of the OR/NOR gate to maintain the OR/NOR gate in its OR mode (that is, the mode in which a binary one OR signal and a binary zero NOR signal are provided). When the input pulse terminates, the OR/NOR gate switches to the NOR mode providing a binary one NOR signal to reset the flip-flop. Thus, a positive-going signal appears at the NOR output passage and a negative-going signal appears at the OR output passage of the OR/NOR gate. Resetting of the flip-flop provides a binary one reset signal therefrom which is fed back to again switch the OR/NOR gate; however, it is at this point in time where an inherent delay in the feedback path comes into play. The NOR signal remains binary one only during the period of time required for the flip-flop to be reset and during which the binary one reset signal travels from the reset output port of the flip-flop to the input port of the OR/NOR gate. Once the binary one reset signal reaches the OR/NOR gate, the OR/NOR gate switches to its OR mode, thereby returning the NOR signal to binary zero and the OR signal to binary one. The shaper thus produces either positive (NOR) or negative (OR) going pulses of constant width, the width being independent of the frequency of the input pulse because the operating time of the shaper is the time required for the reset signal from the flip-flop to be fed back to switch the OR/NOR gate to its OR mode.

BRIEF DESCRIPTION OF THE DRAWINGS

The above and still further objects, features and advantages of the present invention will become apparent upon consideration of the following detailed description of the specific embodiments thereof, especially when taken in conjunction with the accompanying drawings, wherein:

FIGS. 2a, 2b and 2c comprise a composite schematic diagram of the system illustrated in FIG. 1;

DETAILED DESCRIPTION OF THE PREFERRED EMBODIMENTS

Figure 1:
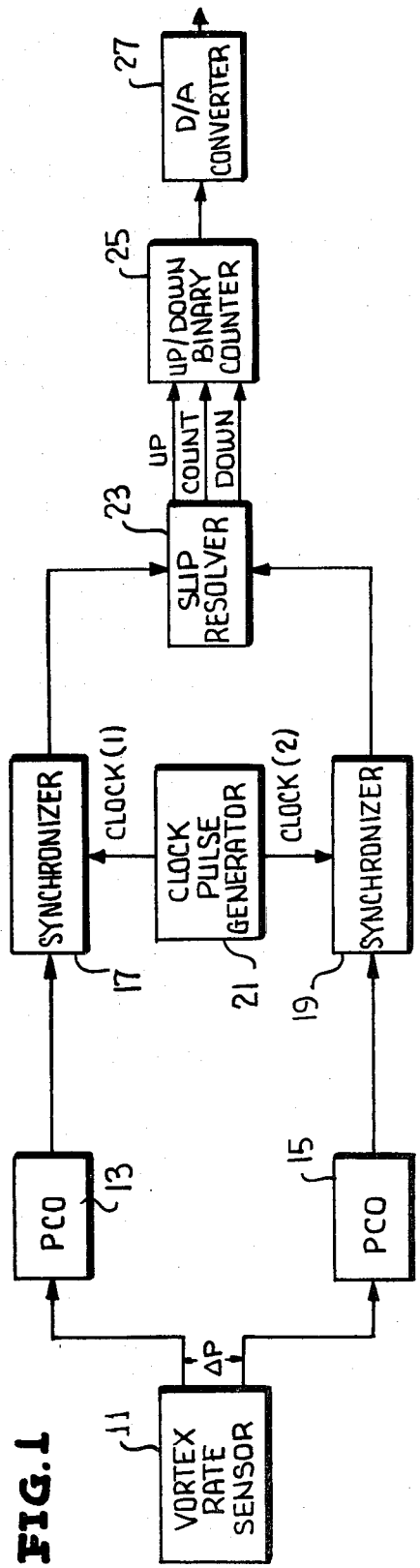
FIG. 1 is a block diagram of a system provided in accordance with the principles of the present invention.

Referring now to FIG. 1 of the accompanying drawings, there is illustrated in block diagram form a vortex rate sensor 11 (for example of the type described and illustrated in U.S. Pat. No. 3,420,109 to Edwin M. Dexter), which provides a pair of differentially varying output pressure signals ($\Delta P$) as a function of the rate of rotation of fluid flowing in the egress orifice of the rate sensor. It will be understood by those skilled in the art that the vortex rate sensor 11 is illustrated by way of specific example only and that any two pressures which vary relative to one another, differentially or not, may be employed as input signals in accordance with the principles of the present invention. One of the differentially varying pressure signals is applied to a pressure controlled oscillator (PCO) 13, the second pressure signal being applied to a PCO 15. PCO's 13 and 15 provide oscillatory fluid output signals as a function of the pressure supplied at the oscillator input port. For the purposes of simplicity in description herein, it is assumed that the two PCO's 13 and 15 include shaping means to provide a positive pressure pulse for each full cycle of oscillation of the respective oscillators. The output signal from PCO 13 is applied to a synchronizer circuit 17 and the output signal from the PCO 15 is applied to another synchronizer circuit 19. Where, as assumed here, for the purpose of the specific system illustrated in FIG. 1, PCO's 13 and 15 have substantially identical output frequency to input pressure characteristics, the difference in frequencies between the two pulse trains applied to the synchronizer circuits 17 and 19 represents a measure of the rate of rotation of fluid egressing from the egress orifice of the vortex rate sensor 11.

A clock pulse generator 21 provides a pair of oppositely phased clock pulse trains, clock (1) and clock (2), which are applied to synchronizer circuit 17 and 19 respectively. The purpose of synchronizer circuit 17 is to shift the pulses provided by PCO 13 in time as necessary so that each synchronized pulse provided by synchronizer 17 corresponds to a pulse received from PCO 13, but in time coincidence with a clock (1) pulse received by synchronizer 17 from clock pulse generator 21. More particularly, if a pulse from PCO 13 and a clock (1) pulse are received simultaneously by synchronizer 17, there is no shift of the pulse from PCO 13; however, where a pulse from PCO 13 is received in the absence of a clock (1) pulse, synchronizer 17 stores the PCO pulse until the next clock (1) pulse is received and at that time provides the stored pulse as a synchronized output pulse. Synchronizer 17 may then be said to provide a train of clocked or phase-synchronized pulses corresponding in number to the randomly phased pulses provided by PCO 13. In like manner, synchronizer 19 serves to shift pulses received from PCO 15 in time as required so that each of the synchronized pulses provided at the output port of synchronizer 19 is time coincident with a clock (2) pulse received from clock pulse generator 21. The two synchronized pulse trains provided by synchronizers 17 and 19 respectively are prevented from having simultaneously occurring pulses by virtue of the fact that the clock (1) and clock (2) signals are oppositely phased. The two synchronized pulse trains, which are applied to slip-resolver circuit 23, are therefore phased such that an input pulse from one synchronized pulse train cannot mask or interfere with reception of an input pulse from the other of the synchronized pulse trains.

It is the function of the slip-resolver circuit 23 to provide a pulse each time the relative phase of the two output signals from PCO's 13 and 15 shifts or slips by a full 360° or $2\pi$ radians. In other words, each time the difference in total number of cycles produced by PCO's 13 and 15 changes (in either sense) by one complete cycle, a count pulse is provided by slip-resolver 23. Similarly, up and down count signals are provided by the slip resolver to indicate which of the two input trains is increasing in frequency relative to the other.

The count pulse and the up and down count signals provided by slip-resolver 23 are applied to an up-down binary counter 25 which stores a count representing the difference between the total number of up counts minus the total number of down counts applied to the counter. Logic circuitry provided within the counter responds to the up and down count signals provided by the slip-resolver to determine whether an individual count pulse should be registered as an up or down count. The count stored in counter 25 is then applied to a digital to analog converter 27 which converts the stored count to an analog signal proportional to the count. This analog signal may then be employed either as an indication or as a control signal. For example, if the vortex rate sensor 11 is used to monitor the attitude of fluid-borne craft, the analog output signal provided by digital to analog converter 27 may provide an indication of the variation of the craft from some reference attitude or may be employed to direct the craft to such an attitude in which a zero differential pressure is provided at the output ports of the vortex rate sensor 11.

Figure 2A:
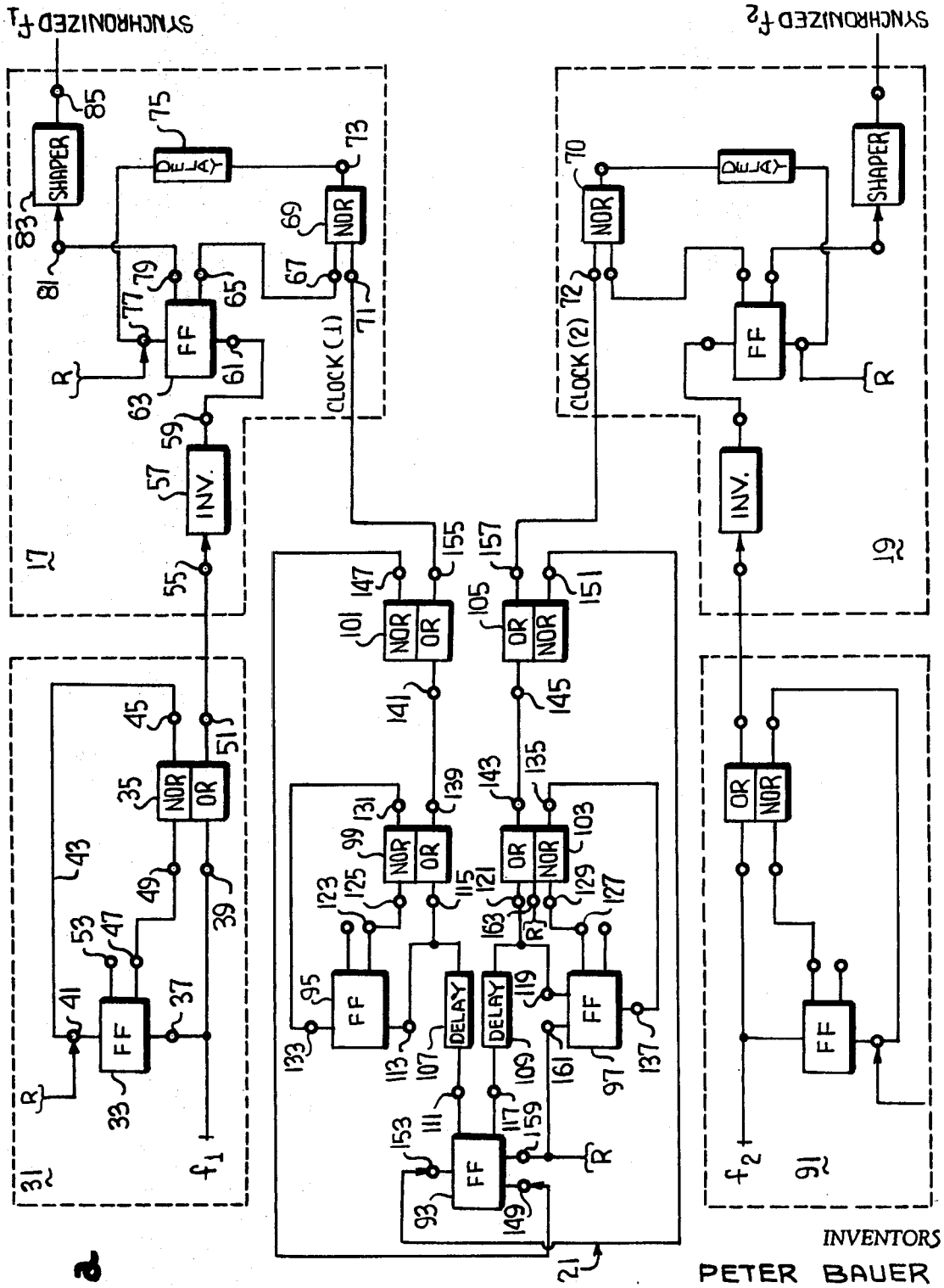
Figure 2B:
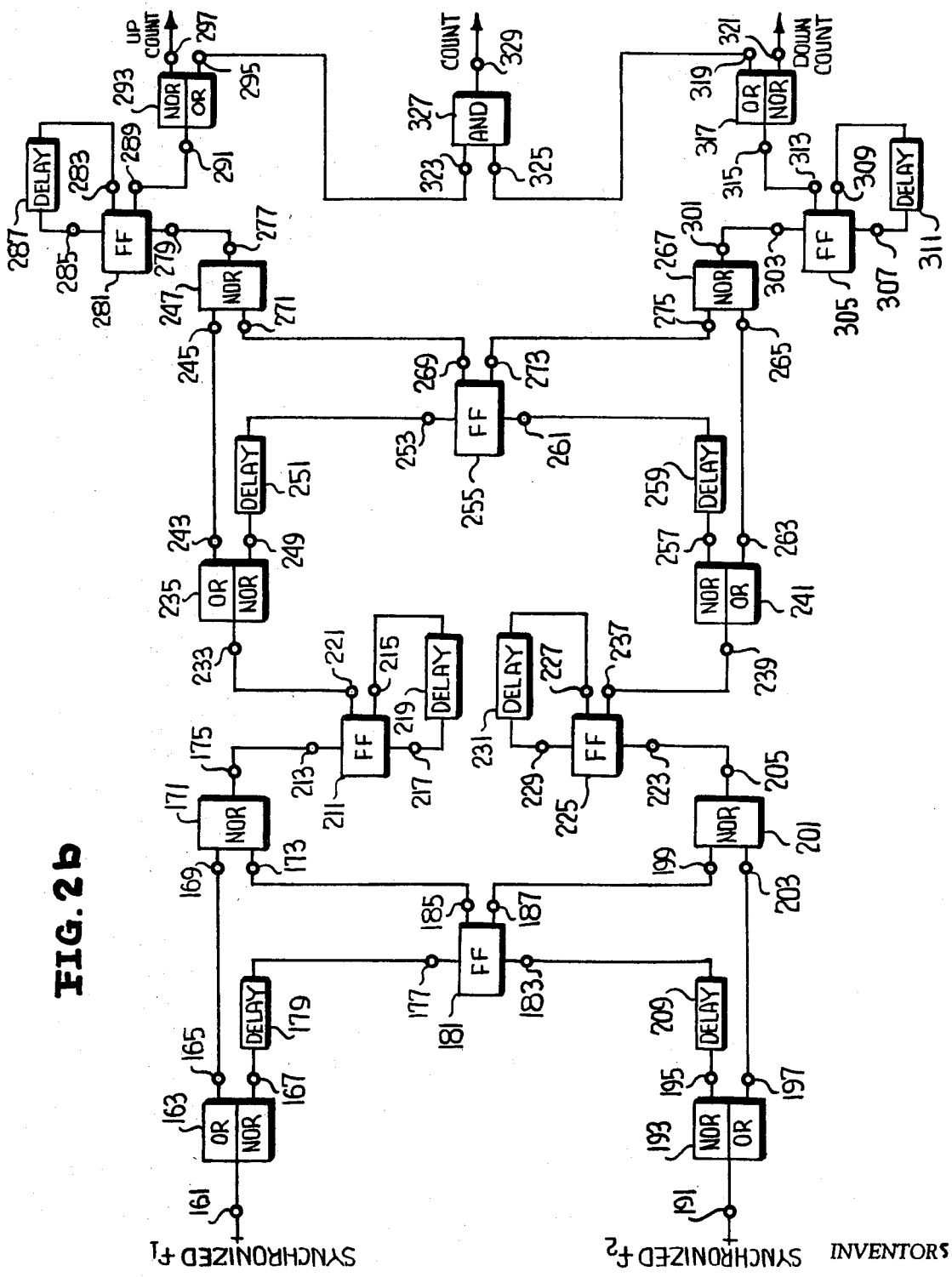

Referring now to FIGS. 2a, 2b, and 2c of the accompanying drawings, there is illustrated in schematic form that portion of the system of FIG. 1 which receives the variable frequency pulse trains from PCO's 13 and 15. More particularly, the input pulse trains are designated in FIG. 2a as $f_1$ and $f_2$ respectively and, within the scope of the present invention, may represent any two pulse trains having a relatively varying frequency difference which is to be monitored. Signal $f_1$, assumed herein to be a variable frequency train of positive going pulses, is applied to an input pulse shaper 31. Pulse shaper 31 is required to give well defined leading and lagging edges to the input pulses to assure precise system switching and thereby eliminate pulse jitter which is a cause of numerous problems in the fluidic digital systems. Shaper 31 comprises a bistable fluidic flip-flop 33 of the set-reset type which, by way of example, may be of the type illustrated and described in U.S. Pat. No. 3,225,780. In addition, shaper 31 includes a fluidic OR/NOR gate 35 which, by way of example may be of the type illustrated in FIG. 4 of U.S. Pat. No. 3,286,086. The input pulse train $f_1$ is simultaneously applied to right input port 37 of flip-flop 33 and input port 39 of OR/NOR gate 35. Left input port 41 of flip-flop 33 is connected by means of fluid passage 43 to NOR output port 45 of OR/NOR gate 35. The right output port 47 of flip-flop 33 is connected to an input port 49 of OR/NOR gate 35. As is well known by those familiar with binary logic, a binary one signal, for our purposes to be considered a positive pressure, appears at NOR output passage 45 of OR/NOR gate 35 only when neither input passage 39 nor 49 receives a binary one signal (i.e. positive pressure); otherwise, a binary zero signal (for our purposes considered substantially zero pressure) appears at passage 45. OR output passage 51 on the other hand is provided with a binary one signal when either of input passages 39 or 49 receive a binary one input signal. Thus, the OR and NOR output signals from OR/NOR gate 35 are always the binary complements of one another. Similarly, as is also well known in the fluidic logic art, flip-flop 33 provides a binary one output signal at right output passage 47 in response to a binary one or positive pressure signal applied to left input port 41, the binary one output signal remaining at output passage 47 after termination of the binary one signal at port 41 until such time as a binary one signal appears at right input port 37 to change the state of the flip-flop and provide a binary one output signal at left output passage 53 of flip-flop 33. Flip-flop 33 exhibits memory in the sense that a binary one signal appears at either of right or left output passages 47 and 53 respectively in accordance with which one of input ports 41 and 37 respectively last received a binary one signal.

The operation of pulse shaper 31 is as follows: Assume flip-flop 33 to be initially reset, such as by application of a reset pulse R to left input port 41, so that a binary one signal is provided at output port 47. This binary one signal is applied to input port 49 of OR/NOR gate 35 to place the latter in its OR mode whereby a binary zero signal is provided at NOR output passage 45 and a binary one signal is provided at OR output passage 51. A positive input pulse from train $f_1$ is applied simultaneously to right input port 37 of flip-flop 33 and input port 39 of OR/NOR gate 35. This pulse changes the state of flip-flop 33, removing the binary one signal from output passage 47 and hence from input port 49 of fluidic OR/NOR gate 35. This, however, does not immediately change the state of OR/NOR gate 35 because the positive pressure input pulse from train $f_1$ remains present at input port 39. Only upon termination of the input pulse does OR/NOR gate 35 change state to its NOR mode whereby to provide a binary one NOR signal via passage 43 to left input port 41 of flip-flop 33 and provide a binary zero (zero pressure) signal at OR output passage 51. The duration of the NOR mode at OR/NOR gate 35 is very short, however, since the binary one NOR signal applied to input port 41 of flip-flop 33 changes the state of that flip-flop to provide a binary one output signal at output port 47 and in turn at input port 49 of OR/NOR gate 35. This binary one signal changes OR/NOR gate 35 back to its OR mode whereby NOR output port 45 provides a binary zero signal and OR output port 51 provides a binary one signal. It is seen therefore that the time required for a binary one NOR signal to travel from NOR output port 45 to input port 41 of flip-flop 33 via passage 43 is a primary determinant of the time period during which OR/NOR gate 35 remains in its NOR mode. Since the width of the shaped negative output pulse appearing at OR output port 51 and the shaped positive pulse appearing at NOR output port 45 is determined by the length of time OR/NOR gate 35 remains in its NOR mode, it is seen that the signal delay introduced by passage 43 determines the width of the output pulses provided by shaper 31. Further, it must be pointed out that merely applying a positive pressure to input port 37 of flip-flop 33 does not produce a shaped output pulse from shaper 31. The applied positive pressure must be removed to produce a shaped pulse; otherwise, the positive pressure remains at input port 39 of gate 35 to prevent the latter from assuming its NOR mode.

It is to be noted that shaper 31 requires no long delay lines to produce the shaping operation since only short or narrow output pulses are desired. In addition, shaper 31 provides constant width output pulses independent of input frequency because the operating time of the shaper is the time required for the NOR output signal to switch flip-flop 33 which in turn switches OR/NOR gate 35. For any particular application, the output pulse width can be changed by varying the length of passage 43 or the length of the passage interconnecting output passage 47 and input passage 49. In addition, the shaper has a large fan-out capability because of the manner in which the shaped pulses have been generated. Specifically, the shaped pulse is produced when flip-flop 33 switches upon receiving a binary one input signal from NOR output passage 45 and feeds back a signal to return OR/NOR gate 35 to its OR mode. Consequently, the shaped pulse at NOR output passage 45 is at a slightly greater level than that required to switch the flip-flop and can therefore be used to switch other elements. In addition, NOR output passage 45 provides shaped positive-going pulses and OR output passage 51 provides shaped negative-going pulses. Either the OR or NOR pulses may be used as desired for a given circuit application. In addition, the shaper provides a reproduction of the input signal at left output passage 53 which can be employed for further use in various circuit applications. This reproduced input signal is of course amplified by virtue of the type of flip-flop employed and thus extends the fan-out capability of the system.

Shaped negative-going or binary zero pulses provided by OR output passage 51 are applied to input port 55 of fluidic logic inverter 57 in synchronizer circuit 17. The function of inverter 57 is to provide at its output port 59 the binary logic complement of the binary input signal applied to its input port 55. Thus, since OR output port 51 of gate 35 quiescently (i.e., in the absence of a pulse on train $f_1$) provides a binary one signal level, output port 59 of inverter 57 is quiescently at zero pressure or at a binary zero logic level, and switches to the binary one level in response to each pulse received from pulse shaper 31. Inverter 57, by way of example, may be similar in configuration to OR/NOR gate 35, wherein only one input port and the NOR output port are employed. Output port 59 of inverter 57 is connected to right input port 61 of flip-flop 63, the latter, by way of example, being of substantially the same configuration as flip-flop 33 described hereinabove. Right output passage 65 of flip-flop 63 is connected to input port 67 of NOR gate 69, the latter, by way of example, being of the same general configuration as OR/NOR gate 35 but in which the OR output port is not utilized. Input port 71 of NOR gate 69 receives the clock (1) train of pulses from clock pulse generator 21, the train comprising a sequence of alternations between the binary one and binary zero signal levels in which the binary zero level is considered to be the clock pulse and the binary one level is considered to be dead time for purposes of the system being described. Generation of the clock pulse train is described in detail hereinbelow.

NOR output passage 73 of NOR gate 69 is connected via a delay means 75 to left input port 77 of flip-flop 63. Delay means 75, by way of example, may be a fluid passage extended sufficiently in length to produce the desired signal delay, the extent of which is described hereinbelow. Left output passage 79 of flip-flop 63 is connected to input port 81 of a pulse shaper 83, the latter being substantially identical to pulse shaper 31 described hereinabove.

The operation of synchronizer circuit 17 is as follows: Flip-flop 63 is initially reset by reset pulse R applied to input port 77 to provide a binary one signal at output passage 65. The binary one signal at output passage 65 is applied to input port 67 of NOR gate 69 to inhibit the NOR output signal and thereby provide a binary zero signal at output passage 73. The quiescently positive or binary one signal provided by pulse shaper 31 is inverted by means of inverter 57 to provide a binary zero signal to input port 61 of flip-flop 63. Output port 79 of flip-flop 63 is in a binary zero state under these conditions and therefore applies no pulse to be shaped by shaper 83. Upon reception of a binary zero pulse at input port 55 of inverter 57, a binary one pulse is provided at output port 59 and in turn at input port 61 of flip-flop 63 to change the state of the latter. Consequently, a binary one signal is provided at left output port 79 and a binary zero signal at right output port 65 of the flip-flop. The binary one output signal at output passage 79 is applied to input port 81 of pulse shaper 83. Shaper 83, like shaper 31 described above, does not provide a shaped output pulse upon receiving a binary one signal, but rather requires subsequent removal of a binary one signal to begin generation of a shaped pulse. Thus, no output pulse is passed to the slip-resolver circuit at this time.

The binary zero signal appearing at output port 65 of flip-flop 63 is applied to input port 67 of NOR gate 69. If a binary zero clock pulse is present at input port 71 of NOR gate 69 at this time, the NOR gate changes state to provide a NOR output signal at output port 73. If no such clock pulse is present, NOR gate 69 remains in its binary zero state until such time as a clock pulse does appear to switch the NOR gate to its binary one state. The resulting binary one signal appearing at output passage 73 of NOR gate 69 is applied via delay means 75 to the left input port 77 of flip-flop 63. Delay means 75 acts to delay application of this binary one signal to the flip-flop for a period of time sufficient to permit an input pulse appearing at right input port 61 to terminate. Flip-flop 63 is then switched to its reset state by the binary one NOR signal. This removes the binary one signal previously applied to shaper 83 from output port 79 and consequently a shaped output pulse is provided by shaper 83 at this time. If delay means 75 were not provided, it is conceivable that a pulse applied to input port 61 simultaneously with the onset of a clock pulse applied to input port 71 of NOR gate 69 would still be present after the binary one NOR signal were applied to input port 77 to reset the flip-flop; under such circumstances, the same input pulse could be processed twice (or possibly lost completely) through the synchronizer and provide a double pulse output from shaper 83 in response to only a single input pulse received from shaper 31. With flip-flop 63 in its reset mode, the synchronizer is primed for reception of the next pulse to be received on train $f_1$.

Input pulse train $f_2$ is applied to input shaper 91 and in turn to synchronizer circuit 19 in a manner identical to that in which input signal $f_1$ is applied to shaper 31 and synchronizer circuit 17. Shaper 91 and synchronizer 19 are identical to shaper 31 and synchronizer circuit 17 respectively and therefore the descriptions of these circuits are not repeated herein. It is important to remember however that the synchronized pulses provided by synchronizer circuit 17 can never be time coincident with pulses provided by synchronizer circuit 19 due to the oppositely phased clock pulse signals applied to each of the two synchronizer circuits.

Clock pulse generator 21 comprises three fluidic flip-flops 93, 95, and 97, four fluidic OR/NOR gates 99, 101, 103, and 105, and a pair of delay means 107, and 109. The flip-flops are configured substantially identical to flip-flops 33 and 63 described hereinabove and the OR/NOR gates are configured substantially identical to OR/NOR gate 35 described hereinabove. OR/NOR gates 101 and 105 differ from OR/NOR gate 35 only in that a single input port rather than two input ports are employed. Flip-flop 95 with gate 99, and flip-flop 97 with gate 103, comprise respective shaper circuits of the type described above with reference to shaper 31.

Left output port 111 of flip-flop 93 has connected in series therewith delay means 107 which comprises any suitable means for delaying a fluid signal by a predetermined amount of time, such for example as a fluid passage of predetermined length. The requirements for the predetermined delay introduced in signals applied to delay means 107 are discussed in detail below. Signals appearing at output port 111 after passing through delay means 107 are applied both to right input port 113 of flip-flop 95 and input port 115 of OR/NOR gate 99. Similarly, signals appearing at right output port 117 of flip-flop 93 are applied by delay means 109 to both left input port 119 of flip-flop 97 and input port 121 of OR/NOR gate 103. Right output passage 123 of flip-flop 95 is connected directly to input port 125 of OR/NOR gate 99, and left output port 127 of flip-flop 97 is connected directly to input port 129 of OR/NOR gate 103.

NOR output port 131 of OR/NOR gate 99 is connected to left input port 133 of flip-flop 95, and NOR output port 135 of OR/NOR gate 103 is connected to right input port 137 of flip-flop 97. OR output port 139 of OR/NOR gate 99 is connected directly to the signal input port 141 of OR/NOR gate 101 and the OR output passage 143 of OR/NOR gate 103 is connected directly to the signal input port 145 or OR/NOR gate 105. NOR output passage 147 of OR/NOR gate 101 is connected to right input port 149 of flip-flop 93 and NOR output port 151 of OR/NOR gate 105 is connected to left input port 153 of flip-flop 93. OR output passage 155 of OR/NOR gate 101 is connected directly to input port 71 of NOR gate 69 in synchronizer circuit 17. It is by means of this last described connection that the clock (1) pulse train is applied to synchronizer circuit 17 from clock pulse generator 21. Similarly, the oppositely phased clock (2) pulse train appears at OR output passage 157 of OR/NOR gate 105 and is connected to input port 72 of NOR gate 70 in synchronizer circuit 19. NOR gate 70 corresponds in function to NOR gate 69 in synchronizer circuit 17.

In operation, flip-flop 93 is initially reset, as by reset signal R applied to a further right input port 159, to provide a binary one output signal at left output port 111. Reset signal R is also applied to a further left input port 161 of flip-flop 97 to initially provide a binary zero signal at left output port 127, and to a third input port 163 of OR/NOR gate 103 to place the latter in its OR mode. The binary one signal appearing at output port 111 of flip-flop 93 is delayed and applied to input port 113 of flip-flop 95 to provide a binary zero signal at output port 123 thereof. This binary zero signal is applied to input port 125 of OR/NOR gate 99; however, since a binary one signal appears at input port 115 of OR/NOR gate 99, the latter remains in its OR mode. The signal at NOR output port 131 is therefore at a binary zero level at this time. The binary one OR signal appearing at OR output port 139 is applied to input port 141 of OR/NOR gate 101 to in turn provide a binary zero signal at NOR output port 147 and a binary one signal at OR output port 155. Thus, a binary zero NOR signal is fed back to input port 149 of flip-flop 93 and binary one OR signal is fed to input port 71 of NOR gate 69 in synchronizer circuit 17. This corresponds to the "off" or "dead time" portion of the clock (1) pulse train applied to synchronizer circuit 17, it being remembered that the binary zero level represents clock pulses in the two clock pulse trains generated by clock pulse generator 21.

In the other half of the clock pulse generator circuit, the binary zero signal appearing at right output port 117 of flip-flop 93 is applied via delay means 109 to left input port 119 of flip-flop 97 and to input port 121 of OR/NOR gate 103. Flip-flop 97 thus remains in its reset mode whereby a binary zero output signal appears at output port 127. At this time, binary zero signals appear at each of input ports 121, 163, and 129 of OR/NOR gate 103, placing the latter in its NOR mode whereby a binary one signal appears at NOR output port 135 and a binary zero signal appears at OR output port 143. The binary zero OR signal is applied to input port 145 of OR/NOR gate 105, which in response thereto, provides a binary zero signal at OR output port 157, from which it is applied as a clock (2) pulse to synchronizer circuit 19. In addition, OR/NOR gate 105 provides a binary one signal from NOR output passage 151. The binary one NOR signals appearing at NOR passages 135 and 151 are fed back to change the states of flip-flops 97 and 93 respectively. Thus the signals at output passages 111 and 117 of flip-flop 93 reverse binary states; however, the effect of this state reversal is not realized in the remainder of clock pulse generator circuit until the change in signal level is propagated through respective delay means 107 and 109. The change in state of flip-flop 97 due to the NOR signal appearing at NOR passage 135 of OR/NOR gate 103, produces a binary one signal at output passage 127, which signal is applied to input port 129 of OR/NOR gate 103. This changes the state or OR/NOR gate 103 to provide a binary one OR signal at output passage 143 and a binary zero NOR signal at output passage 135. The change of state of gate 103 produces a similar change of state in OR/NOR gate 105 so as to terminate the binary zero clock (2) pulse appearing at output passage 157 thereof and at NOR gate 70 of synchronizer circuit 19. It is seen therefore that the period of the binary zero clock (2) pulse applied to synchronizer circuit 19 is determined by the operation of the shaper comprising flip-flop 97 and gate 103; that is, by the time during which OR/NOR gate 103 is in its NOR mode, which in turn is determined by the time required for a binary one NOR signal at NOR passage 135 to change the state of flip-flop 97 so as to apply a binary one signal at input port 129 of OR/NOR gate 103, thereby returning the latter to its NOR mode. The factors controlling this time period are: (1) the length of the fluid passage interconnecting NOR passage 135 of OR/NOR gate 103 and input port 137 of flip-flop 97; (2) the switching time of flip-flop 97; and (3) the length of fluid passage interconnecting output port 127 of flip-flop 97 and input port 129 of OR/NOR gate 103. The choice of these time periods determines the width of the clock pulses.

Upon termination of the delay periods introduced by delay means 107 and 109, a binary one signal is applied to input port 121 so that a binary zero signal is provided at output port 127 of flip-flop 97 and in turn to input port 129 of gate 103. OR/NOR gate 103 remains in its OR mode, keeping gate 105 in its OR mode, so that a binary one signal is applied to synchronizer circuit 19 and corresponds to the off time of the clock pulse train. Substantially simultaneously, the binary zero signal appearing at output passage 111 of flip-flop 93 is applied to input port 113 of flip-flop 95 and input port 115 of OR/NOR gate 99. This binary zero signal has no initial effect on flip-flop 95; however, OR/NOR gate 99 switches to its NOR Mode whereupon a binary one signal appears at NOR output passage 131 and a binary zero signal appears at OR output passage 139. The binary zero signal from the OR output passage 139 is applied to input port 141 of OR/NOR gate 101 which in turn applies a binary zero signal from OR output passage 155 to input port 71 of NOR gate 69 in synchronizer circuit 17. This latter binary zero signal corresponds to the "on" time of the clock (1) pulse train applied to synchronizer circuit 17.

The binary one NOR signal at NOR passage 131 is fed back to input port 133 of flip-flop 95 to change the state of the latter and provide a binary one signal at flip-flop output port 123 and in turn at input port 125 of OR/NOR gate 99 to return gate 99 to its OR mode. Return of gate 99 to its OR mode provides a binary one signal to synchronizer circuit 17, terminating the clock (1) pulse supplied thereto. It is apparent that the period of the clock (1) pulse is determined by the time during which OR/NOR gate 99 is in its NOR mode, which time is in turn determined by the time required for a NOR signal to traverse the passage interconnecting NOR passage 131 and input port 133 of flip-flop 95, and then switch flip-flop 95 to provide a binary one signal at both output port 123 of flip-flop 95 and input port 135 of gate 99. As is the case in determining the period of the clock (2) pulses applied to synchronizer circuit 19, it is possible to select fluid passage appropriate lengths to provide the desired clock pulse widths for the clock (1) pulse train.

The binary zero output signal appearing at OR output passage 139 during the interval that gate 99 is in its NOR mode places gate 101 in its NOR mode so that a binary one signal at NOR passage 147 is fed back to input port 149 of flip-flop 93. This switches flip-flop 93 to provide a binary one signal at output port 111 and a binary zero signal at output port 117. The change in binary levels at ports 111 and 117 is not manifested in the rest of the circuit until after a predetermined period of time as determined by the equal delay period of delay means 107 and 109. Once this delay period terminates, the clock pulse generator cycle begins once again, and a binary zero clock (2) pulse is supplied to synchronizer circuit 19. The effect of delay means 107 and 109 is seen to determine the pulse repetition frequency (PRF) of the clock pulse generator. By appropriately selecting the delay of elements 107 and 109, any desired PRF may be chosen.

For purposes of the system presently under consideration, the PRF of the clock pulse trains is somewhat greater than the maximum input frequency expected from either of signals $f_1$ and $f_2$. In addition, the pulse width for both clock pulse trains is chosen to be less than half of the clock pulse period so that each clock pulse train has less than a 50 per cent duty cycle. The reason for maintaining the duty cycle at less than 50 per cent is twofold: first, if there was no "dead time" between operation of each of synchronizer circuits 17 and 19, synchronized pulses corresponding to pulses from input signals $f_1$ and $f_2$ might be spaced sufficiently close as to obscure one another when applied to the slip-resolver circuit; second, the less than 50 per cent duty cycle prevents a single input pulse from appearing as two synchronized pulses in the case where an unsynchronized input pulse occurs during a clock pulse transition. It should be noted that it is actually delay means 75 in synchronized circuit 17 and the corresponding delay means in synchronizer circuit 19 which, as described above, directly prevents this "double pulse" situation from occurring. However, utilization of delay means 75 as described could result in loss of input pulses if there were no "dead time" provided by the clock pulse generator.

Referring now to FIG. 2b of the accompanying drawings, there is illustrated in schematic form, the slip-resolver circuitry utilized to receive the synchronized $f_1$, synchronized $f_2$ signals from circuits 17 and 19 respectively. The synchronized $f_1$ signal provided by shaper 83 in FIG. 2a is applied to input port 161 of fluidic OR/NOR gate 163. Gate 163 may take the same form as gates 101 and 105 illustrated in FIG. 2a. OR output passage 165 of gate 163 is connected to input port 169 of fluidic NOR gate 171, the latter being substantially the same as gate 69 illustrated in FIG. 2a. NOR passage 167 is connected in series with delay means 179 and left input port 177 of fluidic flip-flop 181. Flip-flop 181, by way of example, may be the same type as flip-flop 33 described in relation to FIG. 2a.

The synchronized $f_2$ pulse train is applied to input port 191 of a fluidic OR/NOR gate 193, the latter being substantially identical to gate 163. OR output passage 197 of gate 193 is connected to input port 203 of fluidic NOR gate 201, the latter being substantially identical to gate 171. NOR output passage 195 of gate 193 is connected via series connected delay means 209 to right input port 183 of flip-flop 181.

Left output port 185 of flip-flop 181 is connected to input port 173 of NOR gate 171, and right output port 187 of flip-flop 181 is connected to input port 199 of NOR gate 201.

Output passage 175 of NOR gate 171 is connected to left input port 213 of flip-flop 211, the latter being substantially identical to flip-flop 181. Right output port 215 and right input port 217 of flip-flop 211 are interconnected by delay means 219. NOR output passage 205 of NOR gate 201 is connected to right input port 223 of flip-flop 225, the latter being substantially identical to flip-flop 211. Left output port 227 and left input port 229 of flip-flop 225 are interconnected via delay means 231.

Left output port 221 of flip-flop 211 is connected to the input port 233 of fluidic OR/NOR gate 235, the latter being substantially identical to gate 163 described above. Right output port 237 of flip-flop 225 is connected to input port 239 of fluidic OR/NOR gate 241. OR output passage 243 of gate 235 is connected to input port 245 of fluidic NOR gate 247, and NOR output passage 249 of gate 235 is connected via delay means 251 to left input port 253 of flip-flop 255. NOR output passage 257 of gate 241 is connected via delay means 259 to right input port 261 of flip-flop 255. OR output passage 263 of gate 241 is connected to input port 265 of NOR gate 267. Left output port 269 of flip-flop 255 is connected to input port 271 of gate 247, and right output port 273 of flip-flop 255 is connected to input port 275 of gate 267.

NOR output passage 277 of gate 247 is connected to right input port 279 of flip-flop 281. Left output port 283 and right input port 285 of flip-flop 281 are interconnected by series connected delay means 287. Right output port 289 of flip-flop 281 is connected to input port 291 of OR/NOR gate 293. NOR output passage 301 of gate 267 is connected to left input port 303 of flip-flop 305, and right input port 307 and right output port 309 of flip-flop 305 are interconnected via delay means 311. Left output port 313 of flip-flop 305 is connected to right input port 315 of fluidic OR/NOR gate 317. OR output passage 295 of gate 293 and OR output passage 319 of gate 317 are connected to respective input ports 323 and 325 of fluidic AND gate 327. Fluidic AND gate 327, by way of example, may be of the type disclosed in U.S. Pat. No. 3,277,915.

Three output signals are provided from the slip-resolver circuit of FIG. 2b, namely: a binary one UP COUNT pulse from NOR output passage 297 of gate 293; a binary one DOWN COUNT pulse from NOR output passage 321 of gate 317; and a binary zero COUNT pulse from OR output passage 329 of gate 327.

The slip-resolver circuit illustrated in FIG. 2b is required to compare the frequencies of the two synchronized input pulse trains and generate a COUNT pulse each time the relative frequency between the unsynchronized $f_1$ and $f_2$ pulse trains slips by one complete cycle. In addition, the UP COUNT pulse is provided to indicate when a COUNT pulse is due to the frequency of train $f_1$ being greater than that of $f_2$, and the DOWN COUNT pulse is provided to indicate when the frequency of $f_2$ is greater than that of $f_1$. To produce these pulses, the following circuit philosophy is employed: As long as pulses from the synchronized $f_1$ and synchronized $f_2$ pulse trains occur in alternation, there is no 360° ($2\pi$) phase slip between the two signals. On the other hand, should two successive pulses from one of these pulse trains occur intermediate two pulses of the other pulse train, a 360° phase change would appear to have occurred between the two input frequencies. In such case, a COUNT pulse should be generated to indicate that a relative phase shift of one complete cycle has occurred. However, due to the fact that a pair of time shifted or synchronized pulse trains (rather than unsynchronized pulse trains ($f_1$ and $f_2$) are being compared, and since the clock pulse synchronizing frequency is greater than frequencies of either of the synchronized $f_1$ or synchronized $f_2$ signals, it is possible that two successive pulses in one of the synchronized pulse trains may occur between two successive pulses in the other synchronized pulse train without a corresponding event taking place in the resynchronized $f_1$ and $f_2$ trains. This phenomena occurs because of the frequency relationship between the unsynchronized signal and the synchronized signal. In fact, a full-cycle slip always occurs in the synchronized trains before an actual full-cycle slip occurs in the unsynchronized input trains. Only the second and subsequent successive slips in the same sense between the synchronized pulse train correspond to an actual slip between the unsynchronized pulse trains. This will become more evident in view of the description of FIG. 3 infra. The slip-resolver circuit of FIG. 2b takes the above-described phenomenon into account by inhibiting the COUNT pulse for a single full-cycle slip between the synchronized trains, but providing a COUNT pulse in response to each successive slip, in the same sense, between the synchronized trains.

In operation, a binary zero or negative-going or negative-going pulse from the synchronized $f_1$ pulse train is applied to input port 161 of gate 163 to provide a binary one pulse at NOR output passage 167 and a binary zero pulse at OR output passage 165. The binary zero OR pulse is applied to input port 169 of NOR gate 171. The other input port 173 of gate 171 is assumed at this time to have a binary one signal applied thereto from left output passage 185 of flip-flop 181. Therefore, gate 171 provides a binary zero output signal at output passage 175. The binary one NOR pulse at output passage 167 of gate 163 is delayed in application to left input port 177 of flip-flop 181 by delay means 179, which delays the binary one signal for a specified period. This specified period must be long enough to permit the binary zero OR pulse at OR output passage 165 to be gated by gate 171 in accordance with the state of flip-flop 181 existing immediately prior to application of the synchronized $f_1$ pulse to gate 163 rather than the state of flip-flop 181 assumed in response to that synchronized $f_1$ pulse. Upon application of the binary one signal to input port 177 of flip-flop 181, the flip-flop changes state to provide a binary zero signal at output port 185 and a binary one signal at output port 187. The binary zero signal of output port 187 of itself is insufficient to activate NOR gate 201 (that is, to provide a binary one signal at output passage 205) because an inhibiting binary one input signal is provided at input port 203 of gate 201 from OR output passage 197 of gate 193. Upon termination of the synchronized $f_1$ pulse, gate 171 remains off (that is, a binary zero signal is provided at NOR passage 175) because of the binary one signal at OR output passage 165 of gate 163, and NOR gate 201 remains deactivated because of both the binary one OR signal from gate 193 as well as the binary one signal from output port 187 of flip-flop 181. If the next input pulse to the slip-resolver is from the synchronized $f_2$ pulse train, the resulting change of state of gate 193 of itself is insufficient to activate gate 201 because of the inhibiting binary one signal from flip-flop output passage 187. On the other hand, if the next input pulse is a synchronized $f_1$ pulse, input ports 169 and 173 of NOR gate 171 simultaneously receive binary zero signals for the duration of that synchronized $f_1$ pulse. Consequently, a binary one pulse is provided at NOR output passage 175.

It is seen therefore that as long as the pulses in the synchronized $f_1$ and synchronized $f_2$ trains alternate in time, binary zero signals are provided by gates 171 and 201. On the other hand, should two successive pulses originate from the same synchronized pulse train, the appropriate one of gates 171 and 201 provide a binary one pulse.

Assume for the moment that gate 171 provides one such binary one pulse. This pulse is applied to input port 213 of flip-flop 211 which is connected to operate as a one shot multivibrator. More specifically, a binary one signal applied to input port 213 changes the state of flip-flop 211 to provide a binary one signal at output port 215 and a binary zero signal at port 221. Flip-flop 211 remains in this state only as long as it takes for the binary one signal at port 215 to propagate back through delay means 219 and to input port 217. When this occurs, flip-flop 211 returns to its quiescent state in which a binary one signal appears at port 221 and a binary zero signal appears at port 215. The signal appearing at output port 221 of flip-flop 211 in response to a binary one pulse from gate 171 is therefore a binary zero signal of width determined by the delay period of delay means 219, and it is applied to input port 233 of gate 235. It is apparent therefore that flip-flop 211 serves a combined function of pulse inversion and pulse widening, the latter feature being required to reshape the pulses to make them compatible for utilization in the subsequent circuitry. Of course, where a pulse such as that appearing at output port 175 of gate 171 is sufficiently wide, the shaping operation, and hence flip-flop 211 may be dispensed with.

In like manner, a binary one NOR signal appearing at passage 205 of NOR gate 201 is inverted and widened by flip-flop 225 and applied as a binary zero pulse of predetermined width to input port 239 of gate 241. Again, the pulse widening function may be utilized or not as required, not only for the output pulses from gates 171 and 201, but anywhere in the system described herein.

A binary zero pulse applied to gate 235 produces a binary one pulse at NOR passage 249, and in turn at port 253 of flip-flop 255 via delay means 251. In addition, a binary zero pulse is provided at OR output passage 243, and in turn at input port 245 of gate 247. The binary zero pulse applied to input port 245 of gate 247 is gated in accordance with the state of flip-flop 255 existing prior to reception of the binary zero pulse at input port 233 of gate 235. To assure that this preexisting state of flip-flop 255 is in fact the gating condition, delay means 251 prevents application of the binary one NOR pulse to input port 253 of flip-flop 255 until the gating function is completed at gate 247.

Similarly, a binary zero pulse applied to input port 239 of gate 241 provides a binary one NOR pulse at output port 257 which in turn is applied by delay means 259 to right input port 261 of flip-flop 255. In addition, gate 241 provides a corresponding binary zero output pulse at OR output passage 263 and in turn at input port 265 of gate 267. This pulse is gated in accordance with the state of flip-flop 255 existing prior to application of the binary zero pulse to input port 239, this operation being assured by the fact that delay means 259 prevents application of the binary one NOR signal to input port 261 of flip-flop 255 until the binary zero input signal at input port 239 has terminated.

As long as gates 235 and 241 receive binary zero input pulses in alternation, gates 247 and 267 provide binary zero output signals. On the other hand, if either of gates 235 and 241 receives successive binary zero pulses, the appropriate one of gates 247 and 267 provides an output pulse.

From the above description of operation, it will be appreciated that the slip-resolver circuit of FIG. 2b may be considered as two substantially identical cascaded stages wherein the first stage comprises OR/NOR gates 163 and 193, flip-flop 181, and NOR gates 171 and 201, and wherein the second stage comprises OR/NOR gates 235 and 241, flip-flop 255, and NOR gates 247 and 267. Thus, NOR gate 247 in the second stage of the slip-resolver circuit provides a binary one output pulse in response to the second and subsequent occurrences of two synchronized $f_1$ pulses between successive synchronized $f_2$ pulses; however, should two synchronized $f_2$ pulses occur between successive $f_1$ pulses, the cycle must begin again and two occurrences of successive $f_1$ pulses between successive $f_2$ pulses are required before gate 247 provides a binary one pulse. Likewise, gate 267 provides a binary one pulse upon the second and subsequent occurrences of two synchronized $f_2$ pulses between successive synchronized $f_1$ pulses, however each time two synchronized $f_1$ pulses occur between two successive $f_2$ pulses, the cycle must begin again and there must be two occurrences of $f_2$ pulses between successive $f_1$ pulses before gate 267 provides a binary one pulse.

Binary one pulses provided at output passage 277 of gate 247 are inverted and widened at flip-flop 281, in the same manner as pulses are widened and inverted by flip-flop 211, to provide corresponding binary zero pulses at input port 291 of OR/NOR gate 293. Similarly, binary one pulses at output port 301 of gate 267 are widened and inverted by flip-flop 305 to provide corresponding binary zero pulses at input port 315 of OR/NOR gate 317. A binary zero input pulse received by gate 293 produces a binary one UP COUNT pulse at NOR output passage 297, the latter being applied to binary counter 25 (FIG. 1) in a manner to be described. A corresponding binary zero pulse appears at OR output passage 295 and is applied to input port 323 of AND gate 327 to provide a corresponding COUNT pulse at output port 329, the COUNT pulse being at a binary zero level. The COUNT pulse so provided is also applied to binary COUNTER 25. Likewise, a binary zero pulse applied to gate 317 produces a binary zero pulse at output passage 319 which in turn is applied to gate 327 to provide a COUNT pulse. In addition, the binary zero pulse applied to gate 317 produces a binary one DOWN COUNT pulse at NOR passage 321.

Figure 3:
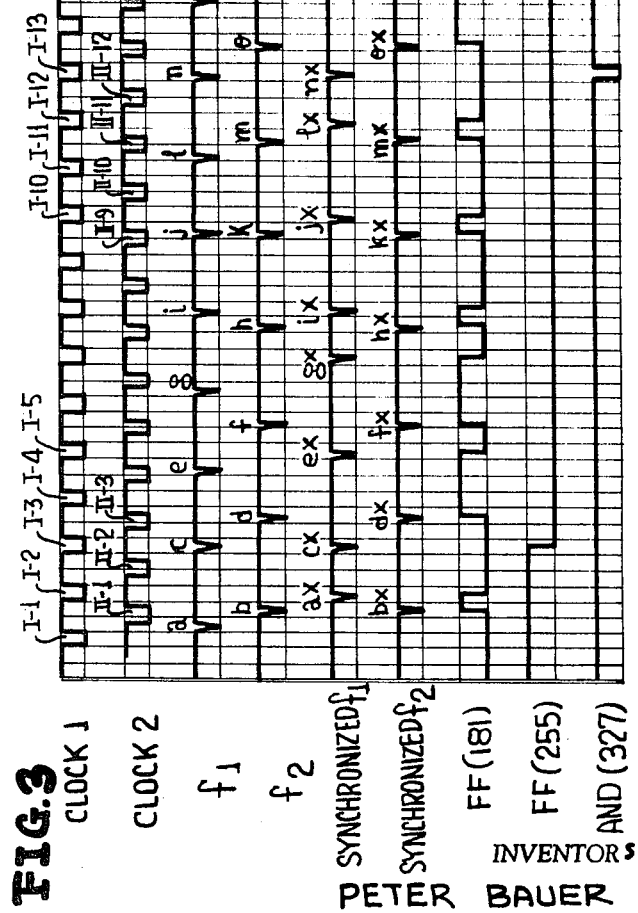
FIG. 3 is a timing diagram illustrating a typical operational mode of the system illustrated in FIGS. 2a, 2b and 2c.

In order to assure proper understanding of the operation of clock pulse generator 21, synchronizer circuits 17 and 19, and slip-resolver circuit 23, as well as the interaction between these circuits, reference is made to FIG. 3 of the accompanying drawing which is a timing diagram illustrating a sample operational sequence for the system of the present invention. In the following description of the operation of the system, it is assumed that the various flip-flops are reset by signal R as indicated in FIGS. 2a and 2b. The clock (1) and clock (2) pulses are oppositely phased trains of binary zero pulses, each consuming less than 50 per cent of the clock PRF duty cycle. The pulses in the clock (1) train are denoted as I-1, I-2, I-3, etc. in sequence, and the pulses in the clock (2) pulse train are designated II-1, II-2, II-3, etc. in sequence. Assume that the first unsynchronized input pulse "a" appears in train $f_1$ and occurs after termination of clock pulse I-1. No corresponding pulse appears in the synchronized $f_1$ pulse train at this time since the clock (1) pulse train is in its "off" or binary one mode. Assume that the next input signal pulse "b" occurs in unsynchronized train $f_2$ in time coincidence with clock pulse II-1. A synchronized pulse "bx" is now produced in the synchronized $f_2$ train due to the time coincidence of the binary unsynchronized $f_2$ and the II-1 clock pulse. If we assume that flip-flop 181 was previously in its binary zero state (defined as that state in which a binary one signal is present at port 187 and a binary zero signal is present at port 185), pulse "bx," after delay by delay means 209, changes flip-flop 181 to its binary one state (defined herein as that state which a binary one signal is provided at port 185 and a binary zero signal is provided at port 187). Upon occurrence of the clock pulse I-2, a binary zero pulse "ax," corresponding to unsynchronized pulse a, is generated on the synchronized $f_1$ line. Pulse "ax," after delay by delay means 179, switches flip-flop 181 back to its binary zero state.

Assume the next input pulse "c" appears on pulse train $f_1$ in time coincidence with clock pulse I-3 in the clock one pulse train. A corresponding binary zero pulse "cx" is produced in the synchronized $f_1$ pulse train and is received at input port 169 of NOR gate 171 while a binary zero signal from output passage 185 of flip-flop 181 is present at input port 173. The resulting binary one NOR pulse from NOR gate 171 is inverted, widened, and applied by delay means 251 to input port 253 of flip-flop 255 to change the state of the latter from binary one to binary zero, it being assumed for present purpose that flip flop 253 was initially reset to its binary one state.

We should examine the above-described sequence at this point in order to fully understand what in terms of slip-resolution has happened. We see for example that an output signal has been provided by NOR gate 171 to change the state of flip-flop 255. This happened because two successive pulses "ax" and "cx" appeared on the synchronized $f_1$ train between consecutive synchronized $f_2$ pulses. Note, however, that the unsynchronized $f_1$ and $f_2$ trains did not experience a similar "slip;" that is, pulses "a" and "c" did not both occur after pulse "b" but rather pulse "a" preceeds pulse "b" and pulse "c" follows pulse "b." The reason for the occurrence of a "slip" between the synchronized trains without a corresponding "slip" between the unsynchronized trains lies in the fact that the synchronized pulses are shifted in time to coincide with respective clock pulses, the latter being generated at a substantially higher frequency than the unsynchronized input pulses. The correlation between the random input frequency and the higher clock pulse frequency produces an initial "lip" between the synchronized $f_1$ and $f_2$ trains. It is for this reason that two stages are provided in the slip-resolver circuit; that is, the second stage of the slip-resolver provides an output pulse only upon two or more "slips" between the synchronized trains.

Proceeding with the operational sequence, assume that the next input pulse "$d$" occurs on train $f_2$ in time coincidence with clock pulse II-3. A corresponding synchronized pulse "$dx$" appears at this time in the synchronized $f_2$ pulse train. Pulse "$dx$" is applied to input port 183 of flip-flop 181 which switches to its binary one state. Assume now that the unsynchronized input pulses occur in alternation between pulse trains $f_1$ and $f_2$ for a period of time so as to produce corresponding alternation between their respective synchronized pulses in the synchronized $f_1$ and synchronized $f_2$ pulse trains. At some later time, input pulse "$j-$" in input pulse train $f_1$ and input pulse "$k$" in input pulse train $f_2$ occur at substantially the same time and in time coincidence with clock pulse II-9. At this time, a synchronized pulse "$kx$" appears in the synchronized $f_2$ pulse train to switch flip-flop 181 from its binary zero to its binary one state. Upon occurrence of clock pulse I-10, synchronized pulse "$jx$" appears in the synchronized $f_1$ pulse train and returns flip-flop 181 to its binary zero state. The next input pulse "$l$" is the seventh input pulse appearing in pulse train $f_1$ since the start of the operational sequence initiated by clock pulse I-1. The next input pulse "$m$" on input pulse train $f_2$ corresponds to only the sixth pulse for train $f_1$. At this point, if the slip resolver circuit operates according to theory, it should provide a COUNT pulse from output port 329 of AND gate 327. In fact, such a COUNT pulse is provided in the following manner: input pulse "$l$" occurs after termination of clock pulse I-11 and does not immediately produce a corresponding pulse on the synchronized $f_1$ pulse train. Input pulse "$m$" however occurs in time coincidence with clock pulse II-11 and therefore provides a pulse in the synchronized $f_2$ pulse train. Upon the occurrence of the next clock (1) pulse I-12, the synchronized pulse "$lx$" is generated and switches flip-flop 181 to its binary zero state. The next input pulse "$n$" occurs on train $f_1$ and in time coincidence with clock pulse I-13 and therefore provides pulse "$nx$" in the synchronized $f_1$ pulse train. Pulses "$lx$" and "$nx$" have occurred between two of the synchronized $f_2$ pulses. Pulse "$nx$" is therefore gated by the binary zero state of flip-flop 181 at NOR gate 171 to provide a binary one signal at port 175. This signal is in turn inverted and applied to gate 235 to provide a binary zero OR signal which is applied to input port 245 of NOR gate 247. Flip-flop 255 is in its binary zero state so that a binary zero signal also appears at input port 271 of gate 247. Consequently, a binary one signal is provided at output port 277 of gate 247, which signal is inverted, widened, and applied as a binary zero pulse to input port 291 of OR/NOR gate 293. Gate 293 provides a binary zero OR pulse which is fed to gate 327 to provide a binary zero COUNT pulse at output port 329. In like manner, the NOR output port 297 of gate 293 provides a binary one UP COUNT pulse indicating that the frequency of pulse train $f_1$ is increasing relative to the frequency of pulse train $f_2$.

As illustrated in FIG. 3, if the frequency of train $f_1$ continues to increase relative to the frequency of pulse train $f_2$, the next slip between trains $f_1$ and $f_2$ causes a similar slip between the synchronized $f_1$ and $f_2$ trains. This produces another binary COUNT pulse at gate 327. On the other hand, though not illustrated in FIG. 3, should the frequency of pulse train $f_2$ begin to increase relative to the frequency of pulse train $f_1$, there will be an initial slip between the synchronized $f_1$ and $f_2$ trains, which slip is unrelated to any slip between train $f_1$ and $f_2$. This will place flip-flop 255 in its binary one state and prime NOR gate 267 for the first slip between trains $f_2$ and $f_1$ in the sense where $f_2$ is increasing. Such a "true" slip will produce a binary zero COUNT pulse from gate 327 and a binary one DOWN COUNT pulse from NOR passage 321 of gate 317. Succeeding "true" slips in the sense where $f_2$ is increasing relative to $f_1$ will produce similar COUNT and DOWN COUNT pulses. Should the relative frequency variation change senses, however, such that $f_1$ increases relative to $f_2$, an initial "false" slip occurs between the synchronized $f_1$ and $f_2$ trains, setting flip-flop 255 to its binary zero state and thereby priming gate 247 for the next "true" slip in the sense that $f_1$ is increasing relative to $f_2$.

Figure 4:
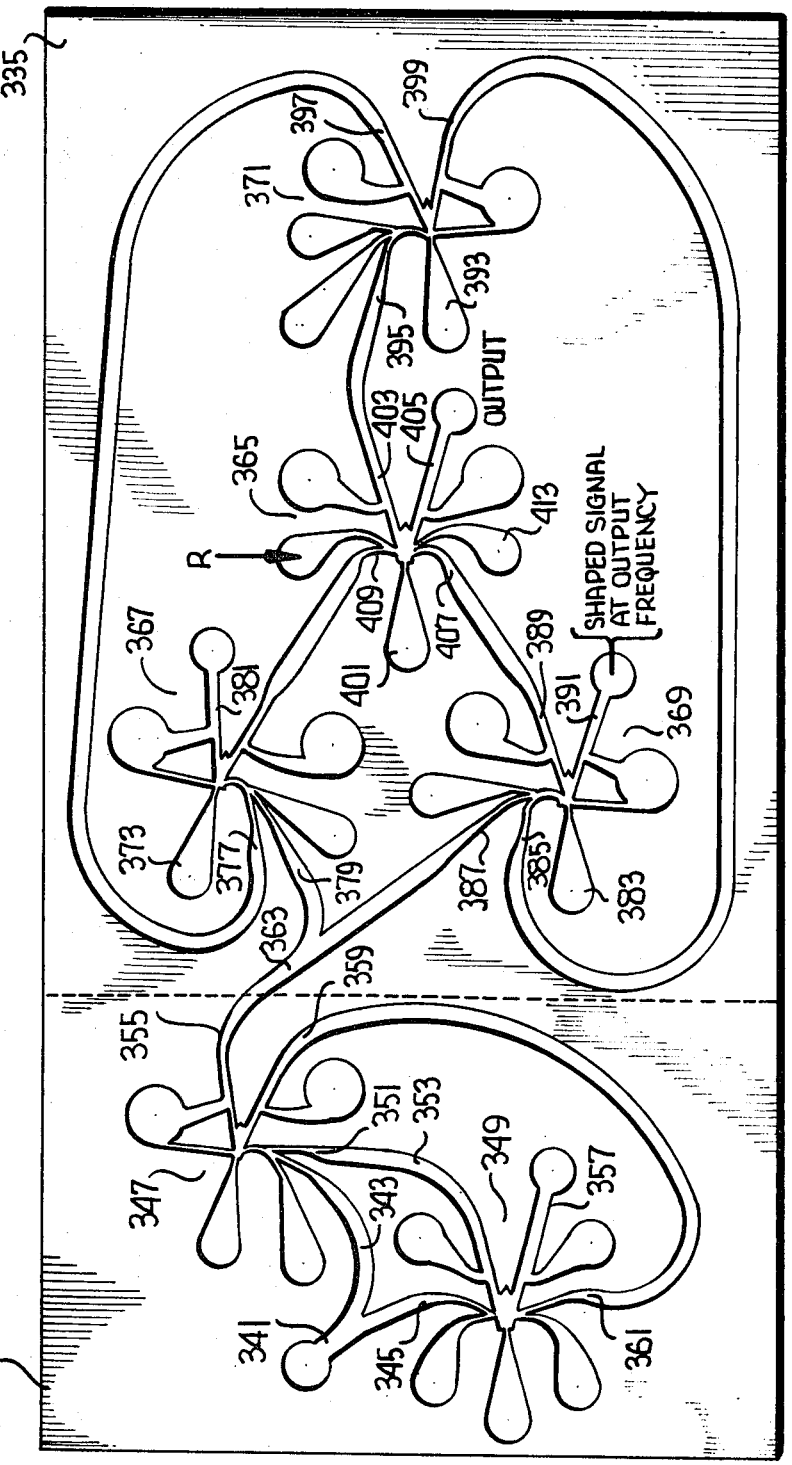
FIG. 4 is a plan view of an interconnected pulse shaper and fluidic pulse converter provided in accordance with the principles of the present invention.

The COUNT, UP COUNT, and DOWN COUNT pulses are all applied to the binary counter circuit illustrated schematically in FIG. 2c. The binary counter circuit comprises six substantially identical pulse conversion stages connected in cascade, although the number of stages is by no means a limiting factor on the scope of the invention. In order to more readily understand the operation of the binary counter circuit, an understanding of the individual pulse converter stages is essential. Therefore, reference is now made to pulse converter stage 335 illustrated in FIG. 4. Also illustrated in FIG. 4 is a pulse shaper 331 which provides shaped binary zero input pulses to pulse converter 335 and which operates in a manner identical to that described in detail above with reference to pulse shaper 31 in FIG. 2a. More particularly, positive going binary one input pulses are applied to input passage 341 of shaper 331. Input passage 341 divides into a pair of fluid passages 343 and 345, passage 343 comprising an input passage to fluidic OR/NOR gate 347, and passage 345 comprising an input passage to fluidic flip-flop 349. A second input passage 351 to gate 347 is connected to output passage 353 of flip-flop 349. Prior to arrival of the positive going input pulse at input passage 341, flip-flop 349 is in a stable state in which a binary one output signal is provided at output passage 353 and hence to input passage 351 of gate 347; thus, arrival of the positive-going binary one signal at input passage 343 of gate 347 does not produce a change of state in the latter and the binary OR signal remains at OR output passage 355. However, the binary one input signal applied to input passage 341, and hence to input passage 345 of flip-flop 349, changes the state of the flip-flop so as to provide a binary one signal at binary output passage 357 and a binary zero signal at output passage 353. Upon termination of the positive-going input pulse there remains no binary one input signal applied to gate 347 and hence this gate returns to its NOR mode wherein a binary one signal is applied to NOR output passage 359 and a binary zero output signal to OR output passage 355. The binary one NOR signal is fed back to input port 361 of flip-flop 349 to change the state of the latter and apply a binary one signal to input port 351 of gate 347. This of course returns gate 347 to its OR mode restoring the binary one signal level to output passage 355. Thus a negative-going pulse, having a width equal to the time during which gate 347 is in its NOR mode, is applied to input passage 363 of pulse converter 335.

Pulse converter 335 comprises a fluidic flip-flop 365 and three fluidic OR/NOR gates 367, 369, and 371 respectively. Flip-flop 365 is substantially identical to flip-flop 33 described in relation to FIG. 2a; gates 367, 369, and 371 are substantially identical to OR/NOR gate 35 described in relation to FIG. 2a with the exception that gate 371 has only one active OR signal-receiving input port and therefore operates as a binary signal amplifier-inverter.

Gate 367 has a power nozzle 373 which is responsive to application of pressurized fluid thereto for normally issuing a power stream of fluid directed toward NOR output passage 375. Upon reception of the binary one input signal at either of input ports 377 or 379 of gate 367, the power stream is deflected toward OR output passage 381, thus providing a binary one signal at OR passage 381 and binary zero signal appears at NOR passage 375. Likewise, gate 369 has a power nozzle 383, a pair of input ports 385 and 387 respectively, a NOR output passage 389, and an OR output passage 391. Gate 371 has a power nozzle 393 and input port 395, a NOR output passage 397 and an OR output passage 399.

Flip-flop 365 has a power nozzle 401 which is responsive to application of pressurized fluid thereto to issue a power stream which is stable when directed toward either of output passages 403 or 405. A binary one input signal at input port 407 deflects the power stream toward output passage 403 and a binary one input signal at port 409 deflects the power stream toward output passage 405. The power stream remains at the output passage toward which it was last deflected until the next application of a binary one input signal to again deflect the power stream.

NOR output passage 375 of gate 367 is connected to input port 409 of flip-flop 365, and NOR passage 389 of gate 369 is connected to input port 407 of flip-flop 365. Output passage 403 of flip-flop 365 is connected to input port 395 of gate 371. NOR passage 397 of gate 371 is connected to input port 377 of gate 367, and OR passage 399 of gate 371 is connected to input port 385 of gate 369.

Input pulses received at input passage 363 of the pulse converter 335 are applied simultaneously to input ports 379 and 387 of gates 367 and 369 respectively, and the output signal from pulse converter 335 is taken from output passage 405 so that pulse converter 335 is considered to be in its binary one state when a binary one signal appears at passage 405 (that is, when the power stream in flip-flop 365 is directed toward output passage 405), and its binary zero state when a binary zero signal appears at output passage 405. Additionally, input ports 411 and 413 of flip-flop 365, are provided to permit reset of flip-flop 365 to either of its two states.

For purposes of describing the operation of pulse converter 335, it is assumed that a reset signal R is applied to input port 411 prior to reception of the first count pulse, and therefore pulse converter 335 is assumed to initially be in its binary one state. Thus a binary zero signal appears at output port 403 of flip-flop 365 which in turn maintains gate 371 in its NOR mode. Consequently, a binary one output signal appears at NOR passage 397 and a binary zero output signal at OR passage 399. The binary one NOR signal from gate 371 is applied to input port 377 of gate 367, placing the latter in its OR mode, whereby a binary zero NOR signal is provided at NOR passage 375 and applied to input port 409 of flip-flop 365. The binary zero OR output signal from gate 371 appears at input port 385 of gate 369; however, the binary one signal appearing at input port 387 of gate 369 maintains the latter in its OR mode. The resulting binary zero NOR signal appearing at NOR passage 389 of 369, is applied to flip-flop 365 along with the binary zero signal appearing at NOR passage 375 of gate 367; therefore flip-flop 365 remains in its binary one state.

Upon application of a binary zero COUNT pulse to input passage 363 of pulse converter 335, the binary one signals appearing at input ports 379 and 387 of gates 367 and 369 respectively are removed for the duration of the count pulse. Since the binary one input signal appearing at input port 377 remains at this time, the binary zero signal at input port 379 does not change the state of gate 367; however, application of the binary zero signal to input port 387 of gate 369, together with the existing binary zero signal at input port 385, switches gate 369 to its NOR mode. This provides a binary one signal at input port 407 of flip-flop 365, changing the state thereof from binary one to binary zero. The resulting binary one signal provided at output passage 403 of flip-flop 365 is applied to input port 395 of gate 371, changing the state of the latter so that a binary zero signal appears at NOR passage 397 and a binary one signal appears at OR passage 399.

The binary one OR signal at passage 399 is applied to input port 385 of gate 369, and the binary zero NOR signal at passage 397 is applied to input port 377 of gate 367. Application of these two signals to respective gates 367 and 369 is delayed, however, for a sufficient period of time to permit termination of the binary zero COUNT pulse applied at input passage 363. This delay is accomplished by means of appropriately long fluid passages interconnecting output passage 397 and input port 377, and interconnecting output passage 399 and input port 385. If such delay were not provided, the switching of gate 371 to its NOR mode would provide a binary zero signal at input port 377 of gate 367 in time coincidence with the binary zero COUNT pulse at input port 379, resulting in a change of state at gate 367 and the reswitching of flip-flop 365. The propagation delay of the output signals from gate 371 back to their respective gates therefore prevents double switching of flip-flop 365 in response to a single COUNT pulse.

After the COUNT pulse has terminated, gates 367 and 369 are primed for the next COUNT pulse by means of the respective output signals from gate 371. Since the state of gate 371 alternates in response to successive COUNT pulses, the "-priming" of gates 367 and 369 also alternates so that each COUNT pulse produces a change of state in flip-flop 365.

The state of pulse converter 335 is represented by the signal appearing at output passage 405 (or passage 403 if desired). In addition, shaped binary zero pulses are produced in alternation at output passages 381 and 391 of gates 367 and 369 respectively in response to successive COUNT pulses applied to input passage 363. The width of these shaped pulses is determined by the period during which respective gates 367 and 369 are in their NOR mode. For example, when gate 367 switches to its NOR mode in response to a count pulse, a negative-going signal appears at output passage 381. Similarly, a positive going, or binary one pulse appears at passage 375 and switches flip-flop 365 which in turn changes the state in gate 371. This in turn applies a binary one signal to input port 377 of gate 367 to remove the binary zero OR signal from output passage 381. Thus, the time required to switch flip-flop 365, to in turn switch gate 371, and then propagate the binary one signal from output passage 397 to input port 377, determines the width of the shaped binary zero pulse appearing at output port 381 of gate 367. These shaped pulses, appearing as they do in alternating fashion in response to successive COUNT pulses, are suitable to drive additional cascaded stages of pulse converters. Therefore additional shapers are not required for succeeding stages in a counter employing multiple converter stages such as stage 335 since shaped pulses for each stage are provided by the preceding stage. It is important to note that the shaped binary zero pulses appearing at passage 381 correspond to a change of state in converter 335 from binary zero to binary one. Similarly, like pulses at passage 391 correspond to changes in state of converter 335 from binary one to binary zero. These shaped binary zero pulses at passages 381 and 391 may therefore be utilized in conjunction with appropriate gating logic as "DOWN" and "UP" input COUNT pulses to the immediately succeeding stage in a counter.

In addition, since input COUNT pulses to succeeding counter stages may be provided from immediately preceding stages rather than being propagated from a signal input line to each of the cascaded stages individually, switching delays within the counter are considerably reduced as compared to prior art fluidic counters. In other words, where all the stages in the counter comprise a circuit such as pulse converter 335, the count increment produced by each COUNT pulse applied to the input stage is registered much more quickly than was the case in prior art fluidic counters due to the fact that it is not necessary to propagate an input COUNT pulse over a long fluid passage to each of the counter stages.

The circuit illustrated in FIG. 4 has been successfully tested for input signals having frequencies from zero to 600 pulses per second.

As mentioned above, the width of the shaped pulses provided by gates 367 and 369 is determined by the period of time during which these gates are in their respective NOR modes. It is noted that two independent factors are determinative of this period of time, namely: the width of the binary zero input pulse received at input passage 363; and the time delay required to feedback a resulting change of state of flip-flop 365 via gate 371. It is apparent therefore that the shaped pulses provided by gates 367 and 369 will have widths equal to the input pulse applied to passage 363 as long as said input pulse is narrower than the feedback delay period. The maximum width for the shaped output pulses is equal to said feedback delay period.

On the other hand, consider the effect on the circuit when an input pulse applied to passage 363 is wider than the feedback delay period. This would cause first one and then the other of gates 367 and 369 to switch in response to the same input pulse, producing in effect an oscillatory operational mode. Hence, it is a requirement for proper operation of pulse converter 335 that input pulses applied to passage 363 be narrower than the time required to feedback the resultant change of state of flip-flop 365 to gates 367 and 369.

Referring now to FIG. 2c of the accompanying drawings there is illustrated in schematic form the up-down binary counter 25 of FIG. 1 constructed utilizing the fluidic pulse converter 335 of FIG. 4 for each counter stage. The input signals applied to counter 25 are the binary zero COUNT pulse from output passage 329 of AND gate 327 in FIG. 2b, the binary zero UP COUNT pulse from NOR passage 297 of gate 293, and the binary zero DOWN COUNT pulse from NOR passage 321 of gate 317. The binary zero COUNT pulse is applied to input port 421 of inverter 432, the latter being substantially identical to inverter 57 in FIG. 2a. Output port 425 of inverter 432 is connected to left input port 427 of fluidic flip-flop 429, the latter, by way of example, being substantially identical to flip-flop 33 of FIG. 2a, and like flip-flop 211 of FIG. 2b is connected to operate in monostable fashion. Right output port 431 of flip-flop 429 is connected via delay means 433 to right input port 435 of the flip-flop. Flip-flop 429 provides a binary zero pulse at left output port 437 of predetermined width in response to a binary one pulse applied to input port 427. Left output port 437 is connected to input port 439 of OR gate 441, the latter, by way of example, being substantially, identical to OR/NOR gate 35 in FIG. 2a, but wherein only the OR output passage is utilized. The primary purpose of gate 441 is to amplify binary one signals appearing at output port 437 of flip-flop 429. If amplification is not required, gate 441 may be omitted. Output port 443 of gate 441 provides a binary zero input pulse to stage I of counter 25 in response to each binary COUNT pulse applied to inverter 432. Stage I is identical to the fluidic pulse converter 335 described hereinabove in reference to FIG. 4, and the various elements comprising stage I are designated by the same numerals designating corresponding elements in FIG. 4, but wherein the designation "(I)" is subscribed thereto to designate the counter stage in which the element appears. Similar designations "(II)," "(III)," etc. are subscribed to like elements comprising identical stages II, III, etc. of the counter. Six stages are illustrated, but this number is by no means limiting. For purposes of describing the operation of counter 25, each converter stage is assumed to be in its binary one state when a binary one signal appears at output passage 403 of flip-flop 365 and in its binary zero state when a binary one signal appears at output passage 405 of flip-flop 365.

The binary zero UP COUNT pulse provided by the slip-resolver circuit in FIG. 2b is applied to left input port 445 of fluidic flip-flop 447, the latter, by way of example, being substantially identical to flip-flop 33 described in relation to FIG. 2a. The right input port 449 of flip-flop 447 receives the DOWN COUNT pulse from the slip-resolver circuit. Flip-flop 447 therefore assumes one stable state in response to an UP COUNT pulse and a second stable state in response to a DOWN COUNT pulse. The state of flip-flop 447 is used by logic circuitry (to be described subsequently) to indicate to the counter which of the two input pulse trains ($f_1$ or $f_2$) has a frequency which is increasing relative to the frequency of the other. The logic circuitry in turn determines whether counter 25 should count up or down in response to a given count pulse.

Left output port 451 of flip-flop 447, which provides a binary one signal only in response to a DOWN COUNT pulse, is connected to input port 455 of OR/NOR gate 457, the latter being substantially identical to gate 35 in FIG. 2a. Right output port 453 of flip-flop 447 is connected to input port 459 of OR/NOR gate 461, the latter being substantially identical to gate 457. Gates 457 and 459 are utilized to amplify binary one signals appearing at output ports 451 and 453 respectively of flip-flop 457 so as to provide greater fan-out capability for operating the logic elements described hereinbelow. OR output passage 463 of gate 461 is connected to input port 465 of OR/NOR gate 467, and NOR output passage 469 of gate 461 is connected to input port 471 of OR/NOR gate 473. NOR output passage 475 of gate 457 is connected to input port 479 of OR/NOR gate 481, and OR output passage 477 of gate 457 is connected to input port 483 of OR/NOR gate 485. OR output passage 487 of OR/NOR gate 485 is connected to input port 489 of OR/NOR gate 491, and NOR output passage 493 of gate 485 is connected to input port 495 of OR/NOR gate 497. Gates 467, 473, 481, 485, 491 and 497 are substantially identical to OR/NOR gate 35 of FIG. 2a. These gates provide priming signals to interstage logic circuitry connected between successive counter stages to control the direction (upward or downward) of counting in response to a given COUNT pulse.

The interstage logic circuitry connected between each pair of successive counter stages is identical and comprises a pair of fluidic AND gates and a fluidic OR gate. More particularly, and referring specifically to the logic circuitry interconnecting stages I and II, AND gate 501 has a first input port 503 connected to OR output passage 505 of gate 467; the other input port 507 of AND gate 501 is connected to the OR output passage 381 (I) of gate 367 (I). AND gate 501 is substantially identical to AND gate 327 described hereinabove in relation to FIG. 2b and operates to provide a binary one output signal at output port 509 only in response to time-coincident binary one signals applied to input ports 503 and 507. A further AND gate 511 has a first input port 513 connected to NOR output passage 515 of OR/NOR gate 467; the other input port 517 of AND gate 511 is connected to OR output passage 391(I) of gate 369(I). The output passages 509 and 519 of AND gates 501 and 511 respectively are connected to respective input ports 521 and 523 of fluidic OR gate 525, the latter being substantially identical to gate 441. OR output passage 527 of gate 525 is connected to input port 379(II) and 387(II) of respective gates 367(II) and 369(II) in stage II of the counter to provide input pulses thereto.

The logic circuitry interconnecting stages I and II operates in the following manner: Assuming all flip-flops 365 in stages I—VI are initially reset by signal R in the manner described in relation to pulse converter 335 of FIG. 4, a first binary zero COUNT pulse applied to inverter 432 produces a shaped binary zero pulse at output passage 443 of OR gate 441 which is applied to stage I of the counter. Since stage I was reset to its binary zero state, gate 371(I) is in its NOR mode and applies a binary one signal to gate 367(I) and a binary zero signal to gate 369(I). The binary zero COUNT pulse, therefore, switches gate 369(I) to in turn provide a binary zero signal at OR passage 391(I) and also change the state of flip-flop 365(I) to binary one. As described above in relation to FIG. 4, the change of state of flip-flop 365(I) produces a change of state in gate 371(I) which returns gate 369(I) to its OR mode. However during the short time interval in which gate 369(I) is in its NOR mode, a binary zero pulse appears at output passage 391(I) and is applied to input port 517 of AND gate 511. If we assume that the first COUNT pulse was accompanied by a DOWN COUNT pulse applied to flip-flop 447 (indicating that pulse train $f_2$ is increasing in frequency relative to $f_1$), then a binary zero signal is present at output port 453 of flip-flop 447, placing gate 461 in its NOR mode. This in turn provides a binary zero signal at input port 465 of gate 467 placing the latter in its NOR mode. Consequently, AND gate 511 receives a binary one NOR signal from gate 467 and AND gate 501 receives a binary zero OR signal from gate 467. The binary zero OR signal from gate 467 inhibits AND gate 501 to provide a binary zero signal at passage 509; on the other hand, the binary zero OR pulse provided at passage 391(I) in response to the first COUNT pulse, inhibits AND gate 511 to provide a binary zero pulse at passage 519. During the time interval when both AND gates 501 and 511 are inhibited (i.e., during the interval of the binary zero OR pulse from gate 369(I), the OR signal at passage 527 of gate 525 is also binary zero and acts to initiate a change of state at stage II. The change of state at stage II follows the same sequence just described for stage I, with flip-flop 365(II) changing to its binary one state. Likewise, since stage II is switched from binary zero to binary one, stage III is switched and in turn stages IV, V and VI are switched to their binary one state.

Now let us assume that instead of a DOWN COUNT pulse, the first COUNT pulse is accompanied by an UP COUNT pulse. Under such circumstances, flip-flop 447 is in such condition as to provide a binary one signal at output port 453 and a corresponding binary one output pulse appears at output port 463 of OR gate 461. A corresponding binary zero signal also appears at NOR passage 515 of gate 467, and a binary one OR signal appears at passage 505 of the same gate. Under the assumption that stages I—VI are initially reset to their binary zero states, the binary zero input OR pulse applied to input port 517 of AND gate 511 in response to the first COUNT pulse is redundant for inhibiting gate 511; this is because the binary zero NOR signal from gate 467 is applied to input port 513 to inhibit gate 511. However, the OR signals from gates 367(I) and 467 are both binary one, maintaining AND gate 501 on, to in turn maintain a binary one input signal to OR gate 525. The binary zero OR pulse from gate 369(I) does not therefore initiate a COUNT pulse for stage II and the latter remains in its binary zero state. Thus, when the counter is counting upward, stage II changes state only in response to a change in stage at stage I from binary one to binary zero; likewise, when the counter is counting downward, stage II changes state only in response to a change in state at stage I from binary zero to binary one. In a similar manner, it may be seen that when the counter is counting upwards, stage (n+1) changes state only in response to a change of state at stage n from binary one to binary zero; likewise, when the counter counts downward, stage (n+1) changes state only in response to changes in state at stage n from binary zero to binary one. Naturally stage I changes state in response to each COUNT pulse, regardless of the counting direction.

The output passage 405 of flip-flop 365 in each of the six stages is connected to digital-to-analog converter 27 of FIG. 1. Digital-to-analog converters of the fluidic type are conventional and may take the form, for example, of that illustrated and described in U.S. Pat. No. 3,495,776 to William C. O'-Neill. The purpose of the digital-to-analog converter is to provide an analog fluid signal having an amplitude which varies in accordance with the count stored at any time in the binary counter 25.

While we have described and illustrated one specific embodiment of our invention, it will be clear that variations of the details of construction which are specifically illustrated and described may be resorted to without departing from the true spirit and scope of the invention as defined in the appended claims.

We claim:

1. A fluidic system for monitoring the difference between the frequencies of first and second fluid input pulse trains, said system comprising:

clock pulse generator means for providing first and second oppositely phased fluid clock pulse trains, each at the same specified frequency and having no greater than a 50 percent duty cycle, said specified frequency being greater than the maximum frequency of said first and second input pulse trains;

first synchronizer means for receiving said first input pulse train and said first clock pulse train and for providing a first synchronized fluid pulse train wherein each pulse corresponds to a respective pulse in said first input pulse train and is time-coincident with a respective clock pulse in said first clock pulse train;

second synchronizer means for receiving said second input pulse train and said second clock pulse train and for providing a second synchronized fluid pulse train wherein each pulse corresponds to a respective pulse in said second input pulse train and is time-coincident with a respective clock pulse in said second clock pulse train;

slip resolver means including: first detector means for detecting the occurrence of more than one pulse of said first synchronized pulse train between successive pulses of said second synchronized pulse train; second detector means for detecting the occurrence of more than one pulse of said second synchronized pulse train between successive pulses of said first synchronized pulse train; first output means responsive to pulses detected by said first detector means for providing an up-count pulse for each pulse in excess of one of said first synchronized pulse train occurring between successive pulses of said second synchronized pulse train;

second output means responsive to pulses detected by said second detector means for providing a down-count pulse for each pulse in excess of one of said second synchronized pulse train occurring between successive pulses of said first synchronized pulse train; and third output means for providing a count pulse for each up-count pulse and down-count pulse provided by said first and second output means, respectively; and means responsive to said count, up-count, and down-count pulses for integrating the frequency difference between said first and second input pulse trains.

2. The system according to claim 1 wherein said last-mentioned means comprises a fluidic up-down binary counter for registering a binary count in response to each count pulse, for adding the registered count when said count pulse is accompanied by an up-count pulse, and for subtracting the registered count when the count pulse is accompanied by a down-count pulse.

3. In a fluidic system for monitoring the frequency difference between first and second input pulse trains:

means for generating first and second oppositely phased fluid clock pulse signals having a frequency greater than the maximum frequency of either of said first and second input pulse trains;

synchronizer means responsive to said input pulse trains and clock pulse signals for time synchronizing said input pulse trains said synchronizer means including first means for phase-shifting each pulse of said first input pulse train into time-coincidence with a respective clock pulse in said first clock pulse signal, and second means for phase-shifting each pulse of said second input pulse train into time-coincidence with a respective clock pulse in said second clock pulse signal;

first bistable means responsive to each phase-shifted pulse from said first pulse train for assuming a first stable state, and responsive to each phase-shifted pulse from said second pulse train for assuming a second stable state;

first fluidic gating means responsive to each phase-shifted pulse from said first pulse train and said first stable state of said first bistable means for providing a fluid output pulse;

second fluidic gating means responsive to each phase-shifted pulse from said second pulse train and said second stable state of said first bistable means for providing a fluid output pulse;

first delay means for delaying the switching of said first bistable means from one stable state to another in response to each of said phase-shifted pulses for a period of time sufficient to permit said first and second fluidic gating means to provide their respective fluid output pulses or not in response to the state of said first bistable means existing immediately prior to said each of said phase-shifted pulses rather than the state to which said first bistable means is switched in response to said each of said phase-shifted pulses;

second bistable means responsive to each fluid output pulse from said first fluidic gating means for assuming a first stable state, and responsive to each fluid output pulse from said second fluidic gating means for assuming a second stable state;

third fluidic gating means responsive to each fluid output pulse from said first fluidic gating means and said first stable state of said second bistable means for providing a fluid output pulse;

fourth fluidic gating means responsive to each fluid output pulse from said second fluidic gating means and said second stable state of said second bistable means for providing a fluid output pulse; and second delay means for delaying the switching of said second bistable means from one stable state to another in response to each of said output pulses from said first and second fluidic gating means for a period of time sufficient to permit said third and fourth fluidic gating means to provide their respective fluid output pulses or not in response to the state of said second bistable means existing immediately prior to the said each of said output pulses from said first and second fluidic gating means rather than the state to which said second bistable means is switched in response to said each of said output pulses from said first and second fluidic gating means.

4. The combination according to claim 3 further comprising a fluidic forward-backward counter having means for accumulating a stored count representing the difference between the number of output pulses provided by said third fluidic gating means and the number of output pulses provided by said fourth fluidic gating means.

5. The combination according to claim 4 further comprising a digital to analog converter responsive to the count stored in said fluidic forward-backward counter for providing an analog fluid pressure signal as a function of said stored count.

6. The combination according to claim 5 wherein said synchronizer means comprises:

a first bistable fluidic element having first and second stable states and first and second input ports, and responsive to application of a first fluid signal to said first input port for assuming said first stable state and responsive to application of a second fluid signal to said second input port for assuming said second stable state;

means for connecting said first input pulse train to said first input port wherein said first bistable fluidic element assumes said first stable state in response to each pulse in said first input pulse train;

fluidic gating means for applying a fluid signal to said second input port in response to each time-coincidence of a clock pulse and said first stable state of said first bistable fluidic element;

output means connected to said first bistable fluidic element for providing a fluid pulse in said first synchronized pulse train whenever said first bistable fluidic element assumes said second stable state;

a second bistable fluidic element having first and second stable states and first and second input ports, and responsive to application of a first fluid signal to said first input port for assuming a first stable state and responsive to application of a second input signal to said second input port for assuming a second stable state;

means for connecting said second input pulse train to said first input port of said second bistable fluidic element wherein said second bistable fluidic element assumes said first stable state in response to each pulse in said second input pulse train;

further fluidic gating means for applying a fluid signal to said second input port of said second bistable fluidic element in response to each time-coincidence of a clock pulse and said first stable state of said second bistable fluidic element;

further output means connected to said second bistable fluidic element for providing a fluid pulse in said second synchronized pulse train whenever said second bistable fluidic element assumes said second stable state.

7. The combination according to claim 6 wherein said binary counter comprises:

a plurality of fluidic pulse converters, each corresponding to a respective stage in said counter, and each pulse converter comprising a bistable fluidic element having first and second stable states, first counter gating means responsive to application of a fluid input pulse thereto whenever said bistable element is in said first stable state for switching said bistable element to its second stable state, and second counter gating means responsive to application of a fluid input pulse thereto whenever said bistable element is in said second stable state for switching said bistable element to its first stable state;

means for applying all of the pulses provided by said third and fourth fluidic gating means of said slip-resolver circuit as input pulses to both said first and second counter gating means of the first stage of said counter;

a plurality of fluidic logic means interconnecting respective successive stages of said counter, each said logic means being responsive to each pulse generated by said first counter gating means in the immediately preceding counter stage for providing an input pulse to both the first and second counter gating means of the counter stage immediately following said immediately preceding stage.

8. The combination according to claim 6 wherein said up-down binary counter comprises:

a plurality of fluid pulse converters, each corresponding to a respective stage in said counter and each comprising:

a bistable fluidic element having first and second stable states assumed in response to application of a pressure signal to respective first and second input ports;

first and second fluidic NOR gates each having a pair of input ports and each connected to a respective input port of said bistable fluidic element to provide a pressure signal thereto in the absence of a pressure signal at both input ports of either NOR gate;

means responsive to the state of said bistable fluidic element for applying a pressure signal to the first input port of said first NOR gate a predetermined time after said bistable element assumes said first stable state and maintaining application of said pressure signal to said first input port for said predetermined period of time after said bistable element assumes said second stable state, said last-mentioned means also applying a pressure signal to said first input port of said second NOR gate for a duration beginning said predetermined period of time after said bistable fluidic element assumes said second stable state and terminating said predetermined period of time after said bistable fluidic element assumes said first stable state;

means for applying a pressure signal to said second input port of both said NOR gates;

means for momentarily interrupting the pressure signal applied to both said second input ports of said NOR gates in said first stage of said counter in response to each pulse generated by said third and fourth fluidic gating means of said slip-resolver circuit; and a plurality of fluid logic circuit means interconnecting respective successive stages of said counter for normally applying a pressure signal to the second input ports of both said NOR gates in the second and successive counter stages and for momentarily interrupting said last mentioned pressure signal in response to prescribed counting logic conditions.

9. A system for monitoring the difference between the frequencies of first and second input pulse trains, said system comprising:

timing means for generating periodic signals, said periodic signals defining regular time intervals, said regular time intervals being shorter than the minimum time interval between successive pulses in each input pulse train;

first means arranged to receive said first input pulse train and said periodic signals for providing in only a first portion of said regular time intervals a first synchronized pulse train wherein each pulse corresponds to a respective pulse in said first input pulse train;

second means arranged to receive said second input pulse train and said periodic signals for providing in only a second portion of said regular time intervals a second synchronized pulse train wherein each pulse corresponds to a respective pulse in said second input pulse train; and
slip-resolver means including: detector means for detecting the occurrence of a second and subsequent pulses of one of said synchronized pulse trains between two successive pulses of the other of said synchronized pulse trains; and output means responsive to pulses detected by said detector means for providing an output pulse for each detected pulse.

10. The system according to claim 9 further comprising a binary counter for registering a binary count in response to each of said output pulses.

11. A slip-resolver in a fluidic system for monitoring relative frequency variations between first and second fluid pulse trains, said system comprising:
first bistable fluidic means responsive to each pulse in said first pulse train for assuming a first stable state and responsive to each pulse in said second pulse train and for assuming a second stable state;
fist fluidic gating means responsive to each pulse in said first pulse train occurring while said first bistable fluidic means is in said first stable state for providing a first fluid signal;
second fluidic gating means responsive to each pulse in said second pulse train occurring while said first bistable fluidic means is in said second stable state for providing a second fluid signal;
second bistable fluidic means responsive to said first fluid signal for assuming a first stable state and responsive to said second fluid signal for assuming a second stable state;
third fluidic gating means responsive to occurrence of said first fluid signal while said second bistable fluidic means is in said first stable state for providing an up-count pulse indicating completion of at least one more cycle of said first pulse than of said second pulse train over a determinable period of time;
fourth fluidic gating means responsive to occurrence of said second fluid signal while said second bistable fluidic means is in said second stable state for providing a down-count pulse indicating completion of at least one more cycle of said second pulse train than of said first pulse train over a determinable period of time.

12. The slip resolver according to claim 11 further comprising:
first delay means for delaying assumption by said first bistable fluid means of said first stable state in response to each pulse of said first pulse train for a period of time sufficient to permit said first fluidic gating means to provide said first fluid signal or not in accordance with the state of said first bistable fluidic means immediately prior to occurrence of said each pulse in said first pulse train;
second delay means for delaying assumption by said first bistable fluidic means of said second stable state in response to each pulse in said second pulse train for a period of time sufficient to permit said second fluidic gating means to provide said second fluid signal or not in accordance with the state of said first bistable fluidic means immediately prior to occurrence of said each pulse of said second pulse train;
third delay means for delaying assumption by said second bistable fluidic means of said first stable state in response to said first fluid signal for a period of time sufficient to permit said third fluidic gating means to provide said up-count pulse or not in accordance with the state of said second bistable fluidic means immediately prior to occurrence of said first fluid signal;
fourth delay means for delaying assumption by said second bistable fluidic means of said second stable state in response to said second fluid signal for a period of time sufficient to permit said fourth fluidic gating means to provide said down-count pulse or not in accordance with the state of said second bistable fluidic means immediately prior to occurrence of said second fluid signal.

13. A fluidic slip-resolver system for monitoring relative frequency variations between first and second input fluid pulse trains, wherein the pulses in said pulse trains each comprise a pulsed interruption of a positive pressure, said slip-resolver system comprising:
first and second fluidic inverter means responsive to the pulsed interruptions in said first and second input pulse trains for providing corresponding first and second trains of positive pressure pulses;
a first fluidic flip-flop having first and second input ports and first and second output ports, having a first stable state assumed in response to a positive pressure at said first input port exceeding the pressure at said second input port and in which a positive pressure signal is provided at said first output port while substantially zero pressure is provided at said second output port, and having a second stable state assumed in response to a positive pressure at said second input port exceeding the pressure at said first input port and in which a positive pressure signal is provided at said second output port while substantially zero pressure is provided at said first output port;
means for applying said first and second trains of positive pressure pulses to said first and second input ports respectively of said first flip-flop, said means for applying including delay means connected in series between said inverter means and said respective input ports of said first flip-flop for delaying application of said positive pressure pulses to said respective input ports for a predetermined period of time;
first and second fluidic NOR gates, each having a pair of input ports and a NOR output port, and in which a positive pressure is provided at said NOR output port only in the absence of a positive pressure at both of said pair of input ports and substantially zero pressure is provided at said NOR output port whenever a positive pressure is applied to either of said pair of input ports;
first fluid passage means for interconnecting said output port of said first flip-flop to one of said pair of input ports of said first fluidic NOR gate;
means for applying the pulsed interruption of said first input pulse train to the other of said pair of input ports of said first fluidic NOR gate;
second fluid passage means for interconnecting first output port of said first flip-flop to one of said pair of input ports of said second fluidic NOR gate;
means for applying the pulsed interruption of said second input pulse train to the other of said pair of input ports of said second fluidic NOR gate;
wherein said predetermined period of time by which application of pulses of said first flip-flop is delayed is sufficiently great to permit each pulsed interruption of said first and second input pulse train to reach said other of said pair of input ports of said first and second fluidic NOR gates respectively before its corresponding positive pulse provided by said inverter means is applied to a respective input port of said first flip-flop; and
wherein a positive pressure appearing at the NOR output passage of said first NOR gate is indicative that the frequency of said first input pulse train is greater than the frequency of said second input pulse train, and a positive pressure appearing at the NOR output passage of said second NOR gate is indicative that the frequency of said second input pulse train is greater than the frequency of said first input pulse train.

14. The system according to claim 13 further comprising:
a second fluidic flip-flop having first and second input ports and first and second output ports, having a first stable state assumed in response to a positive pressure at said first input port exceeding the pressure at said second input port and in which a positive pressure signal is provided at the said first output port while substantially zero pressure is provided at said second output port, and having a second stable state assumed in response to a positive pressure at said second input port exceeding the pressure at said first input port and in which a positive pressure signal is provided at said second output port while substantially zero pressure is provided at said first output port;

third and fourth fluidic NOR gates each having a pair of input ports and a NOR output port and in which a positive pressure is provided at said NOR output port only in the absence of a positive pressure at both of said pair of input ports, and substantially zero pressure provided at said NOR output port whenever a positive pressure is applied to either of said pair of input ports;

third fluid passages means for interconnecting said second output of said second flip-flop to one of said pair of input ports of said third fluidic NOR gate;

fourth fluid passage means for interconnecting said first output port of said second flip-flop to one of said pair of input ports of said fourth fluidic NOR gate;

first fluidic means responsive to a positive pressure at the NOR output passage of said first fluidic NOR gate for applying a positive pressure pulse to the first input port of said second fluidic flip-flop and for momentarily interrupting a positive pressure applied to the other input port of said fluidic NOR gates;

second fluidic means responsive to a positive pressure at the NOR output passage of said second fluidic NOR gate for applying a positive pressure pulse to the second input port of said second fluidic flip-flop and for momentarily interrupting a positive pressure applied to the other input port of said fourth fluidic NOR gate; and means for delaying application of each positive pressure pulse to the input port of said second flip-flop for a period of time sufficient to permit its corresponding pulsed interruption provided by said first and second fluidic means to reach said other of said pair of input ports of said third and fourth NOR gates respectively prior to the application of said each pulse to an input port of said second flip-flop;

wherein a positive pressure appearing at the NOR output passage of said third NOR gate is indicative that at least one more complete cycle of said first input pulse train than of said second input pulse train has occurred, and a positive pressure appearing at the NOR output passage of said second NOR gate is indicative that at least one more complete cycle of said second input pulse train has occurred than of said first input pulse train.

15. A fluidic system for monitoring the difference between the frequencies of first and second fluid input pulse trains, said system comprising:

timing means for generating periodic signals, said periodic signals defining regular time intervals, said regular time interval being shorter than the time between successive pulses in each input pulse train;

first means arranged to receive said first input pulse train and said periodic signals for providing during only the first half portions of said regular time intervals a first synchronized fluid pulse train wherein each pulse corresponds to a respective pulse in said first input pulse train;

second means arranged to receive said second input pulse train and said periodic signals for providing during only the second half portions of said regular time intervals a second synchronized fluid pulse train wherein each pulse corresponds to a respective pulse in said second input pulse train; and slip-resolver means including: first detector means for detecting the occurrence of a second and subsequent pulses of said first synchronized pulse train between successive pulses of said second synchronized pulse train; second detector means for detecting the occurrence of a second and subsequent pulses of said second synchronized pulse train between successive pulses of said first synchronized pulse train; first output means for providing a fluid up-count pulse for each pulse detected by said first detector means; and second output means for providing a fluid down-count pulse for each pulse detected by said second detector means.

16. The system according to claim 15 further comprising a fluidic up-down binary counter for registering a binary count, said counter including: means for adding one count to the registered count in response to each up-count pulse; and means for subtracting one count from the registered count in response to each down-count pulse.

17. A slip-resolver in a fluidic system for monitoring the difference between two frequencies of first and second fluid pulse trains, said system comprising:

first detector means for detecting the occurrence of two and more pulses of said first pulse train between successive pulses of said second pulse train;

second detector means for detecting the occurrence of two and more pulses of said second pulse train between successive pulses of said first pulse train;

first output means for providing a fluid up-count pulse for each pulse detected by said first detector means; and second output means for providing a fluid down-count pulse for each pulse detected by said second detector means.

18. A fluidic system for monitoring relative frequency variations between first and second input fluid pulse trains, said system comprising:

timing means for generating periodic signals defining regular time intervals, said regular time interval being shorter than the minimum time interval between successive pulses in each input pulse train;

first means arranged to receive said first input pulse train and said periodic signals for providing during only the first-half portions of said regular time intervals a first synchronized pulse train wherein each pulse corresponds to a respective pulse in said first input pulse train;

second means arranged to receive said second input pulse train and said periodic signal for providing during only the second-half portions of said regular time intervals a second synchronized pulse train wherein each pulse corresponds to a respective pulse in said second input pulse train;

a bistable fluidic means responsive to each pulse in said first synchronized pulse train for assuming a first stable state and responsive to each pulse of said second synchronized pulse train for assuming a second stable state;

first gating means responsive to each pulse of said first synchronized pulse train occurring while said bistable fluidic means is in said first stable state for indicating that the frequency of said first synchronized pulse train is greater than the frequency of said second synchronized pulse train;

second gating means responsive to each pulse of said second synchronized pulse train occurring while said bistable fluidic means is in said second stable state for indicating that the frequency of said second synchronized pulse train is greater than the frequency of said first synchronized pulse train; and delay means for delaying assumption of a stable state by said bistable fluidic means in response to each pulse from said synchronized pulse trains for a period of time sufficient to permit said first and second gating means to provide said indications or not in response to the state of said bistable fluidic means immediately prior to occurrence of each synchronized pulse rather than in response to the state assumed by said bistable fluidic means in response to said each synchronized pulse.

19. The fluidic system according to claim 18 wherein:

said bistable fluidic means comprises:

a flip-flop having a power nozzle responsive to application of pressurized fluid thereto for issuing a power stream of fluid;

first and second output passages disposed for selectively receiving said power stream;

control means comprising first and second control nozzles disposed on opposite sides of the power stream and responsive to application of pressurized fluid to said first control nozzle for issuing a first control stream to deflect said power stream toward said first output passage and responsive to application of pressurized fluid to said second control nozzle for issuing a second control stream to deflect said power stream toward said second output passage; and means for maintaining said power stream directed toward the one of said output passage to which it was last deflected unless deflected by a control stream;

said first and second gating means comprise respectively:

first and second fluidic NOR gates each having a power nozzle responsive to application of pressurized fluid thereto for issuing a fluid power stream, at least one outlet passage disposed to receive said power stream when undeflected; and control means including a pair of control nozzles disposed on the same side of said power stream and responsive to application of pressurized fluid to either or both said pair of control nozzles for issuing a control stream to deflect the power stream away from said at least one outlet passage;

said circuit further comprises:

means including said delay means for applying pulses of said first synchronized pulse train to said first control nozzle of said flip-flop and to one of said pair of control nozzles of said NOR gate, and for applying pulses of said second synchronized pulse train to said second control nozzle of said flip-flop to one of said pair of control nozzles of said second NOR gate;

means for interconnecting said first output passage of said flip-flop to the other of said pair of control nozzles of said second NOR gate;

means for interconnecting said second output passage of said flip-flop to the other of said pair of control nozzles at said first NOR gate; and inverter means connected to said output passage of each of said NOR gates for providing a fluid signal in response to the absence of a fluid stream in said output passage of either of said NOR gates.